United States Patent
Zeng et al.

(10) Patent No.: US 12,493,827 B2
(45) Date of Patent: Dec. 9, 2025

(54) DISTRIBUTED MACHINE LEARNING COMPILER OPTIMIZATION

(71) Applicant: QUALCOMM Incorporated, San Diego, CA (US)

(72) Inventors: Weiliang Zeng, San Diego, CA (US); Christopher Lott, San Diego, CA (US); Edward Teague, San Diego, CA (US); Yang Yang, San Diego, CA (US); Joseph Binamira Soriaga, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 517 days.

(21) Appl. No.: 18/056,379

(22) Filed: Nov. 17, 2022

(65) Prior Publication Data

US 2024/0177048 A1     May 30, 2024

(51) Int. Cl.
*G06N 20/00*     (2019.01)

(52) U.S. Cl.
CPC ................................. *G06N 20/00* (2019.01)

(58) Field of Classification Search
CPC .............................. G06N 20/00; G06F 8/4441
See application file for complete search history.

(56) References Cited

U.S. PATENT DOCUMENTS

| | | | |
|---|---|---|---|
| 11,016,775 B2 | 5/2021 | Huynh et al. | |
| 11,392,356 B1 | 7/2022 | Leopoldseder et al. | |
| 12,293,299 B1* | 5/2025 | Sharma | G06N 3/045 |
| 2019/0391796 A1* | 12/2019 | Brady | G06F 8/458 |
| 2019/0392296 A1* | 12/2019 | Brady | G06N 3/063 |

OTHER PUBLICATIONS

International Search Report and Written Opinion—PCT/US2023/075354—ISA/EPO—Jan. 26, 2024.
Tang L., et al., "Scheduling Computation Graphs of Deep Learning Models On Manycore CPUs", arXiv:1807.09667v1 [cs.DC], Arxiv. Org, Cornell University Library, 201 Olin Library Cornell University Ithaca, NY 14853, Jul. 16, 2018, XP081253698, pp. 1-19, p. 1, right-hand column, paragraph 1, p. 7, left-hand column, paragraph 3.

\* cited by examiner

*Primary Examiner* — Dave Misir
(74) *Attorney, Agent, or Firm* — Holland & Hart LLP

(57) ABSTRACT

A method for optimizing the compilation of a machine learning model to be executed on target edge devices is provided. Compute nodes of a plurality of compute nodes are allocated to a compiler optimization process for a compiler of said machine learning model. The machine learning model has a compute graph representation having nodes that are kernel operators necessary to execute the machine learning model and edges that connect said kernel operators to define precedence constraints. A round of optimization is scheduled for the process amongst the allocated compute nodes. At each allocated compute node a sequencing and scheduling solution is applied per round to obtain a performance metric for the machine learning model. From each compute node the performance metric is received and a solution that has the best performance metric is identified and implemented for execution of the machine learning model on the target edge devices.

30 Claims, 11 Drawing Sheets

DISTRIBUTED MACHINE LEARNING COMPILER OPTIMIZATION

FIELD OF THE DISCLOSURE

Aspects of the present disclosure generally relate to the compiling of machine learning models and more particularly to an optimization for machine learning compilers for allowing machine learning models an improved utilization of hardware resources in a heterogeneous compute environment on edge devices.

BACKGROUND

Machine learning generally produces a trained model (e.g., an artificial neural network, a tree, or other structures), which represents a generalized fit to a set of training data that is known a priori. Applying the trained machine learning model to new data produces inferences, which may be used to gain insight into the new data. In some cases, applying the model to the new data is described as "running an inference" on the new data.

With the widespread use of machine learning models in everyday life scenarios, there is an increased interest in running machine learning models on edge devices. Edge devices are in general those devices that form the entry or exit points for networks and regularly form consumer devices such as smartphones, cars, drones, etc. In the context of a wireless communication network the user equipment or UE devices that form the user interface to mobile users can be regarded as being an edge device. Edge devices normally have limited hardware resources compared to other network entities such as e.g., a centralized server network computing tasks. Implementing machine learning models on edge devices and running inferences for said machine learning model with a compiled executable code on such devices without computing support by a cloud or central server poses many challenges. The optimization of machine learning compilers becomes more and more critical, and in fact, it is expected to be the area of intense competition in the future.

Recently many different high-level programming machine learning frameworks such as PyTorch or Tensorflow have emerged and are widely used by programmers to set up and train machine learning models in a variety of applications such as object detection, image classification, etc. These machine learning frameworks allow a machine learning model setup for example in terms of artificial neural network models. The trained machine learning models constructed thereby are then compiled to executable machine code using machine learning compilers, which attempt to optimize the execution (or, inference) of the trained machine learning model. Edge devices may form a variety of hardware compute environments having differing degrees of specific hardware support for machine learning applications. Often said compute environments include various machine learning accelerators and the machine learning compilers need to account for such device specific hardware configurations.

The optimization of machine learning compilers (i.e., compilers for machine learning models) is challenging but it is important for various reasons: it has a large impact on user experience and performance of the machine learning model. The performance regarding a compiled version of a machine learning model (i.e., of the generated machine code after compilation) can be measured for example with the following key performance indices: inference per second (IPS), DDR read/write bandwidth, power consumption, memory (TCM) footprint, etc. Also, a good compilation is a key differentiator for machine learning accelerators. In other words, the best machine learning accelerator does not necessarily become a market success unless the machine learning compiler can optimize different machine learning models for it and make full use of the machine learning accelerator hardware that is available at the device that executes the compiled machine learning model. The space of feasible compiling solutions is extremely large for typical machine learning models. Machine learning models are often represented as directed graphs, for which a compiler attempts to find a valid topological ordering. The number of possible topological orderings for even just a small subset of a real-world graph for a machine learning model could be more than for example the search space of game of Go ($250^{150}$ possible solutions).

Machine learning models are often designed in terms of artificial neural networks. Said artificial neural networks may comprise interconnected groups of artificial neurons (e.g., neuron models). The artificial neural network may be a computational device or represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs) such as deep convolutional neural networks (DCNs) have numerous applications. In particular, these neural network architectures are used in various technologies, such as image recognition, pattern recognition, speech recognition, autonomous driving, and other classification tasks.

Neural networks consist of operands that consume tensors and produce tensors. Neural networks can be used to solve complex problems, however, because of the network size—and the number of computations that may be performed to produce the solution may be voluminous—the time for the network to complete a task may be long. Furthermore, because these tasks need to be performed on mobile edge devices, which may have limited computational power, the computational costs of deep neural networks may be problematic.

Deep neural networks may take the form of a heterogeneous architecture. Although heterogeneous architectures may provide greater flexibility in neural network design, with such architectures, memory and power consumption may significantly increase with large overhead as compared to homogenous architectures.

Heterogeneous accelerator systems have been designed to improve the speed of processing with many such devices including different hardware components or cores such as central processing units (CPUs), graphics processing units (GPUs), digital signal processors (DSPs), or artificial intelligence processors (AIPs), neural processing units (NPUs) and neural signal processors (NSPs) that may be used in parallel processing of different neural network tasks or sub-tasks. Each of the different components have different capabilities and characteristics. Some heterogeneous systems may also include homogenous subsystems (e.g., 1 GPU, 2 identical DSPs, and two identical NSPs).

Optimizing compilation of different machine learning models in the context of different heterogeneous systems poses many challenges and is regarded to be NP-hard (non-deterministic polynomial-time hard) in general. It could be very difficult to find a good solution within tight compilation time budget. Also, an accurate modeling of a hardware environment (such as for different machine learning accelerators) is desired, but could be too complex or costly to use for compiler optimization. Notably, an inaccurate modeling of the hardware during compilation optimization may lead to unexpected performance degradation on actual hardware.

SUMMARY

In an aspect of the present disclosure, a method for optimizing the compilation of one or more machine learning models is provided. The machine learning model is to be executed on one or more target edge devices. The method is for a controller in communication with a plurality of compute nodes. The method generally includes allocating compute nodes of said plurality of compute nodes to a compiler optimization process for a compiler of said machine learning model, the machine learning model being generated in a machine learning framework and having a compute graph representation forming machine learning model information. Nodes of said compute graph representation are kernel operators necessary to execute the machine learning model and edges of said compute graph representation connect said kernel operators to define precedence constraints amongst the kernel operators. The method further includes scheduling a round of optimization for the compiler optimization process amongst the allocated compute nodes. The compiler optimization process comprises applying at each allocated compute node at least one sequencing and scheduling solution that was determined based on hardware information for the one or more target edge devices and the precedence constraints. Each sequencing and scheduling solution maps the kernel operators upon hardware resources and upon compiling leads to execution on one of the compute nodes and results in a performance metric for the machine learning model. The method further includes receiving from the compute nodes said performance metric for said round of optimization. The method further includes identifying one or more sequencing and scheduling solutions having the best performance metric amongst the sequencing and scheduling solutions applied at the compute nodes. And finally the method includes implementing in the compiler the optimal sequencing and scheduling solution for generating machine code to execute the machine learning model on the one or more target edge devices.

In another aspect of the present disclosure, a method for optimizing compilation of one or more machine learning models is provided. The machine learning model is to be executed on one or more target edge devices. The method is for a plurality of computing nodes. The method in general includes receiving instructions at each of the plurality of computing nodes to participate in a compiler optimization process for a compiler of said machine learning model. The machine learning model is generated in a machine learning framework and having a compute graph representation forming machine learning model information. The nodes of said compute graph representation are kernel operators necessary to execute the machine learning model and edges of said compute graph representation connect said kernel operators to define precedence constraints amongst the kernel operators. The method further includes receiving instructions at each of the plurality of computing nodes to execute a round of optimization for the compiler optimization process including at least one respective sequencing and scheduling solution that was determined based on hardware information for the one or more target edge devices and the precedence constraints. The method further includes applying at each computing node said at least one respective sequencing and scheduling solution. Each applied sequencing and scheduling solution maps the kernel operators to hardware resources and corresponds to a respective machine code which upon execution on the computing nodes results in a respective performance metric for the machine learning model. The method further includes sending said performance metric from each of the compute nodes to the controller for identifying an optimal sequencing and scheduling solution having the best performance metric amongst the applied sequencing and scheduling solutions, and for implementing in the compiler the optimal sequencing and scheduling solution for executing the machine learning model on the one or more target edge devices.

In a further aspect of the present disclosure, a controller for optimizing compilation of one or more machine learning models is provided. The machine learning model is to be executed on one or more target edge devices. The controller is in communication with a plurality of compute nodes. The controller includes a processor that is configured to allocate compute nodes of said plurality of compute nodes to a compiler optimization process for a compiler of said machine learning model. The machine learning model was generated in a machine learning framework prior to compilation and has a compute graph representation forming machine learning model information. The nodes of said compute graph representation are kernel operators necessary to execute the machine learning model and edges of said compute graph representation connect said kernel operators to define precedence constraints amongst the kernel operators. The processor is configured to schedule a round of optimization for the compiler optimization process amongst the allocated compute nodes. The compiler optimization process comprises applying at each allocated compute node at least one sequencing and scheduling solution that was determined based on hardware information for the one or more target edge devices and the precedence constraints. Each sequencing and scheduling solution maps the kernel operators upon hardware resources and upon compiling the solution leads to execution on one of the compute nodes and results in a performance metric for the machine learning model. The processor is further configured to receive from the compute nodes the performance metric for said round of optimization. The processor is also configured to identify one or more sequencing and scheduling solutions that have the best performance metric amongst the sequencing and scheduling solutions applied at the compute nodes. The processor is also configured to implement in the compiler the optimal sequencing and scheduling solution for generating machine code to execute the machine learning model on the one or more target edge devices.

In yet another aspect of the present disclosure, a system comprising a plurality of compute nodes for optimizing compilation of one or more machine learning models is provided. The machine learning model is to be executed on one or more target edge devices. The plurality of compute nodes is in communication with a controller. Each node of the plurality of compute nodes comprises a processor. The processor is configured to receive instructions to participate in a compiler optimization process for a compiler of the machine learning model. The machine learning model was generated in a machine learning framework and has a compute graph representation forming machine learning model information. The nodes of said compute graph representation are kernel operators necessary to execute the machine learning model and edges of said compute graph representation connect said kernel operators to define precedence constraints amongst the kernel operators. The processor is further configured to receive instructions to execute a round of optimization for the compiler optimization process including at least one respective sequencing and scheduling solution that was determined based on hardware information for the one or more target edge devices and the precedence constraints. The processor is further configured to apply said at least one respective sequencing and scheduling solution. Each applied sequencing and scheduling solution maps the kernel operators to hardware resources and corresponds to a respective machine code which upon execution on the computing nodes results in a respective performance metric for the machine learning model. The processor is further configured to send said performance metric to the controller for identifying an optimal sequencing and scheduling solution having the best performance metric amongst the applied sequencing and scheduling solutions and for implementing in the compiler the optimal sequencing and scheduling solution for executing the machine learning model on the one or more target edge devices.

Aspects generally include methods, an apparatus and a system, as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
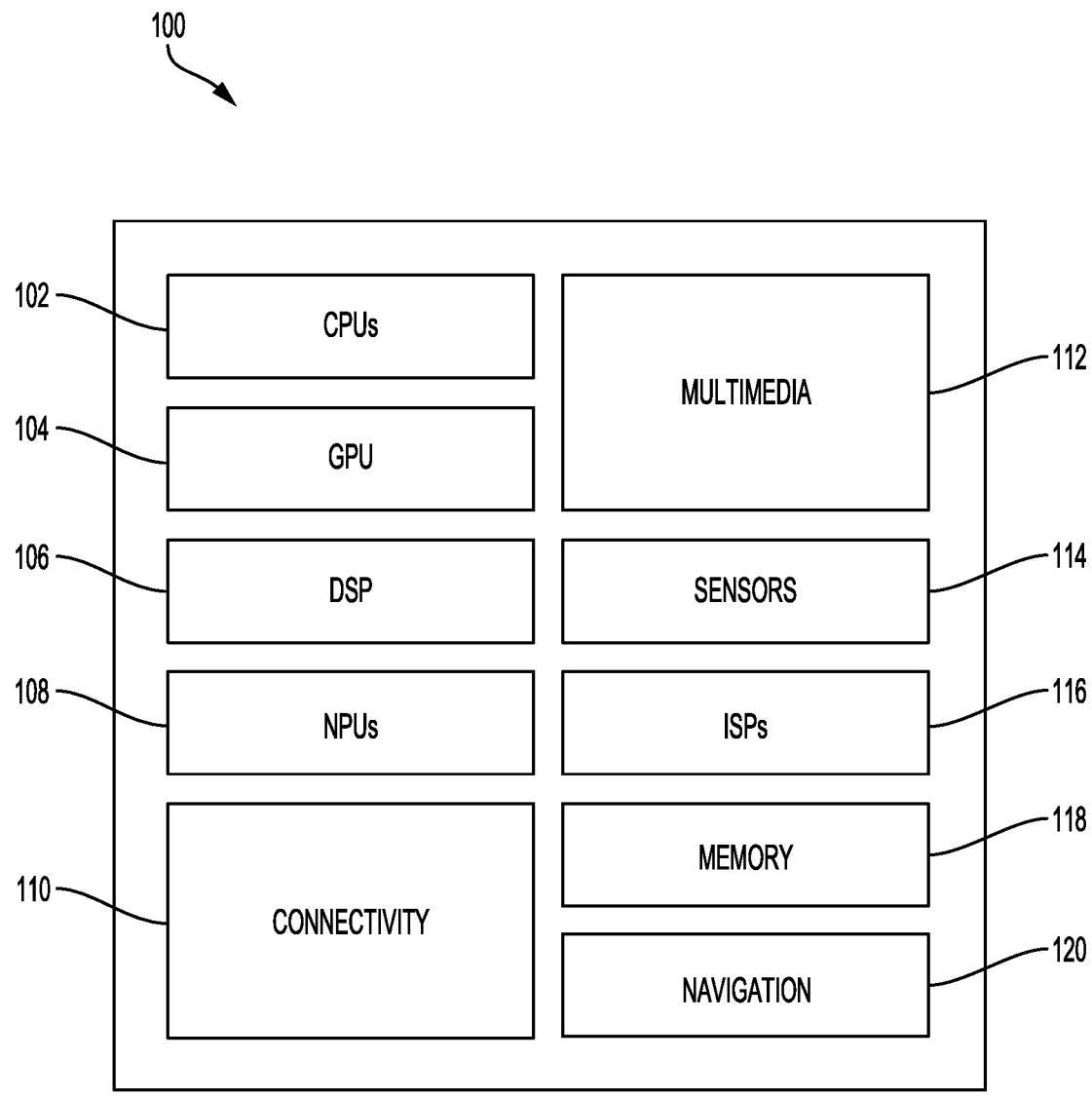
FIG. 1 illustrates an example implementation of a machine learning model using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Deep Neural Networks for Implementing Machine Learning Models and Compiling Thereof The present application refers to machine learning models in general. One specific exemplary implementation for a machine learning model are deep neural networks. Deep neural networks may be used in many real-world settings as the standard process for computer vision, translation, voice recognition, ranking, and many other practical use cases. Because of this success, the efficiency of neural networks has become an area of greater focus. More efficient neural networks may reduce cloud infrastructure costs and enable operation of neural networks on edge devices such as smartphones, Internet of things applications, and dedicated low-power hardware.

Deep neural networks may be processed using a heterogeneous architecture such as heterogeneous accelerator systems including many different hardware components or cores such as central processing units (CPUs), graphics processing units (GPUs), digital signal processors (DSPs), or artificial intelligence processors (AIPs), neural processing units (NPUs) and neural signal processors (NSPs). The components may be used in parallel processing of different neural network tasks or sub-tasks. Although heterogeneous architectures may provide greater flexibility in neural network design, such architecture's memory and power consumption may significantly increase with large overhead as compared to homogenous architectures.

To improve the speed of processing in heterogeneous architectures, a compiler needs to compile a machine learning model from a high-level programming framework (such as Pytorch) to executable binary machine code such that the parallel processing capabilities of the architecture are optimal exploited when running inferences of the machine learning model. Network partitioning for the underlying neural networks have been applied for said purpose. Conventional networks partitioning algorithms traverse the neural network layers in a sequential fashion. These conventional network partitioning techniques draw a partition whenever the runtime (e.g., a hardware accelerator or core device) changes. Unfortunately, conventional approaches lead to highly inefficient partitioning for certain network topologies, causing the network to ping-pong between runtimes (e.g., hardware blocks). Additionally, because conventional network partitioning creates more subnets, the overall machine learning model inference time increases considerably due to the overhead of switching between cores/accelerators (e.g., CPUs, GPUs, DSPs, NPUs or NSPs).

A machine learning model—and its underlying neural network—may be represented using compute graphs. A special form of a compute graph is a directed acyclic graph that is often used in the context of machine learning model representation. A directed acyclic graph (DAG) is a finite directed graph with no direct cycles. A DAG may include many vertices or nodes and edges or arcs. High-level DAGs may represent neural networks such that the nodes of the compute graph may correspond to layers of the neural network. Lower-level DAGs may represent neural networks such that the nodes of the compute graph may correspond to kernel operations for individual layers of the neural network. During compilation of the machine learning model each of the nodes is associated with a runtime or hardware resource. For heterogeneous architectures, multiple types of the nodes and edges of the graph may be associated to multiple types of hardware resources at various times.

According to aspects of the present disclosure it is attempted to optimize the mapping of nodes of the compute graph representing the network to hardware resources according to a constraint-based approach. Such mapping involves a sequencing (order of operations) as well as a scheduling (deciding which operation to execute on which hardware resource). Conventional approaches are often forced to evaluate all possible mapping solutions, thus producing a compiler optimization process that is NP-hard. Current approaches to compiler optimization rely on different heuristics to reduce the number of mapping solutions to the compute graph and/or rely on inaccurate accelerator modeling during the compiler optimization. But heuristics may not work well for different machine learning models and/or different accelerator environments. Also, an inaccurate hardware model may create mismatch when executing the compiled machine code on the actual edge device hardware. Since new machine learning models and machine learning accelerators are designed frequently, there is a great interest to have a better solution for a compiler optimization.

To address these and other issues, aspects of the present disclosure are directed to a distributed graph-level based optimization during compilation of a machine learning model to derive an optimal mapping to hardware resources at an edge device executing said machine learning model. The optimization scheme derives a mapping having—amongst a possible set of mappings—a best performance metric in terms of e.g., more efficient use of hardware resources. Some aspects of the present disclosure are in particular directed to a distributed compiler optimization for mapping kernel operators to hardware resources at an edge device. In accordance with aspects of the present disclosure a controller allocates compute nodes for said distributed compiler optimization process, initiates one or more rounds of the compiler optimization process amongst the compute nodes and gathers result information from the compute nodes in order to determine further rounds of optimization and/or to determine an optimal mapping solution.

An Exemplary SOC for Supporting Machine Learning

FIG. 1 illustrates an example implementation of a system-on-a-chip (SOC) 100, which may include a central processing unit (CPU) 102 or a multi-core CPU configured to perform said compiler optimization process (or parts thereof) in order to derive an optimal scheduling and sequencing solution for an improved utilization of hardware resources when executing the machine learning model on an edge device in accordance with certain aspects of the present disclosure. In the context of a preferred embodiment, executing the machine learning model corresponds to processing machine code for a neural network on said edge device. The SOC 100 may be part of at least one of the following: a target edge device, on which the machine learning model is to be executed, a controller for the distributed compiler optimization process or a compute node participating in the distributed compiler optimization process.

Variables (e.g., neural signals and synaptic weights), system parameters associated with a machine learning model (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include one or more sensors 114, image signal processors (ISPs) 116, and/or navigation module 120, which may include a global positioning system.

In an aspect of the present disclosure, the instructions loaded into the CPU 102 may comprise code to receive a representation of the machine learning model including multiple nodes connected by edges. Each of the multiple nodes is to be associated with one of a set of multiple types of hardware resources. Each of the multiple types of hardware resources is different than other types of hardware resources. The instructions loaded into the CPU 102 may also comprise code to execute the methods for optimizing the compilation of the machine learning model(s) that are to be executed on one or more target edge devices as summarized above.

For example, if the SOC 100 is part of the controller for the distributed compiler optimization process, the instructions may include code to allocate compute nodes of a plurality of compute nodes to a compiler optimization process for a compiler of said machine learning model, the machine learning model being generated in a machine learning framework and having a compute graph representation forming machine learning model information, wherein the nodes of said compute graph representation are kernel operators necessary to execute the machine learning model and the edges of said compute graph representation connect said kernel operators to define precedence constraints amongst the kernel operators. The instructions may further include code to schedule a round of optimization for the compiler optimization process amongst the allocated compute nodes. The compiler optimization process comprises applying at each allocated compute node at least one sequencing and scheduling solution that was determined based on hardware information for the one or more target edge devices and the precedence constraints. Each sequencing and scheduling solution maps the kernel operators upon hardware resources and upon compiling leads to execution on one of the compute nodes and results in a performance metric for the machine learning model. The instructions may further include code to receive from the compute nodes a respective performance metric for said round of optimization. The instructions may further include code to identify one or more sequencing and scheduling solutions having the best performance metric amongst the sequencing and scheduling solutions applied at the compute nodes. The instructions may also include code to implement in the compiler the optimal sequencing and scheduling solution for generating machine code to execute the machine learning model on the one or more target edge devices.

Also, if the SOC 100 is part of a compute node participating in the distributed compiler optimization process the instructions may include code to receive instructions to participate in the compiler optimization process for the compiler of said machine learning model. The instructions may further include code to receive instructions to execute the round of optimization for the compiler optimization process including at least one sequencing and scheduling solution that was determined based on hardware information for the one or more target edge devices and precedence constraints. The instructions may also include code to apply the at least one sequencing and scheduling solution thereby mapping the kernel operators to hardware resources and defining machine code. The instructions may further include code to send said performance metric to the controller for identifying an optimal sequencing and scheduling solution having the best performance metric amongst the applied sequencing and scheduling solutions, and for implementing in the compiler the optimal sequencing and scheduling solution for executing the machine learning model on the one or more target edge devices.

Training of Deep Neural Networks

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases (as for example done in the later discussed BERT model).

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
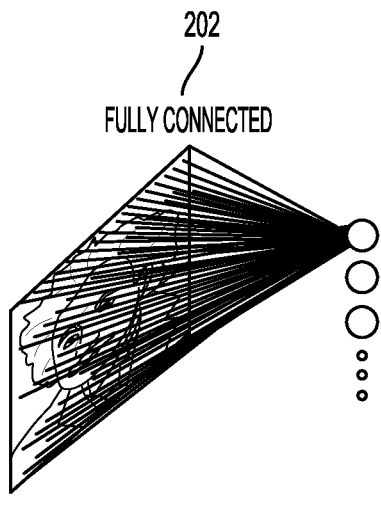
FIGS. 2A, 2B, and 2C are diagrams illustrating a machine learning model in terms of a neural network in accordance with aspects of the present disclosure.
Figure 2B:
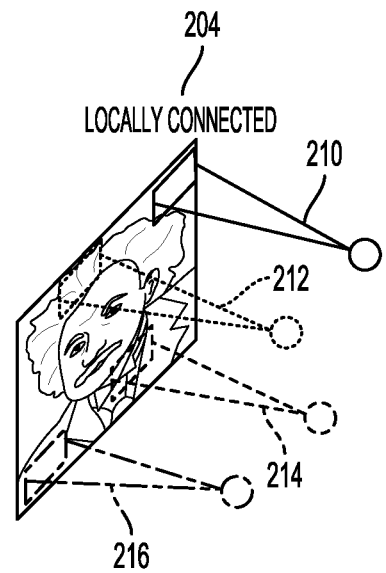

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
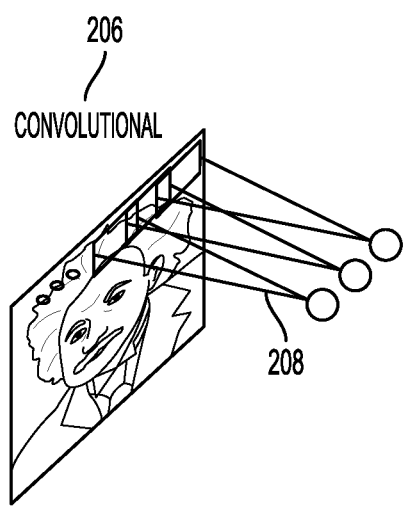

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
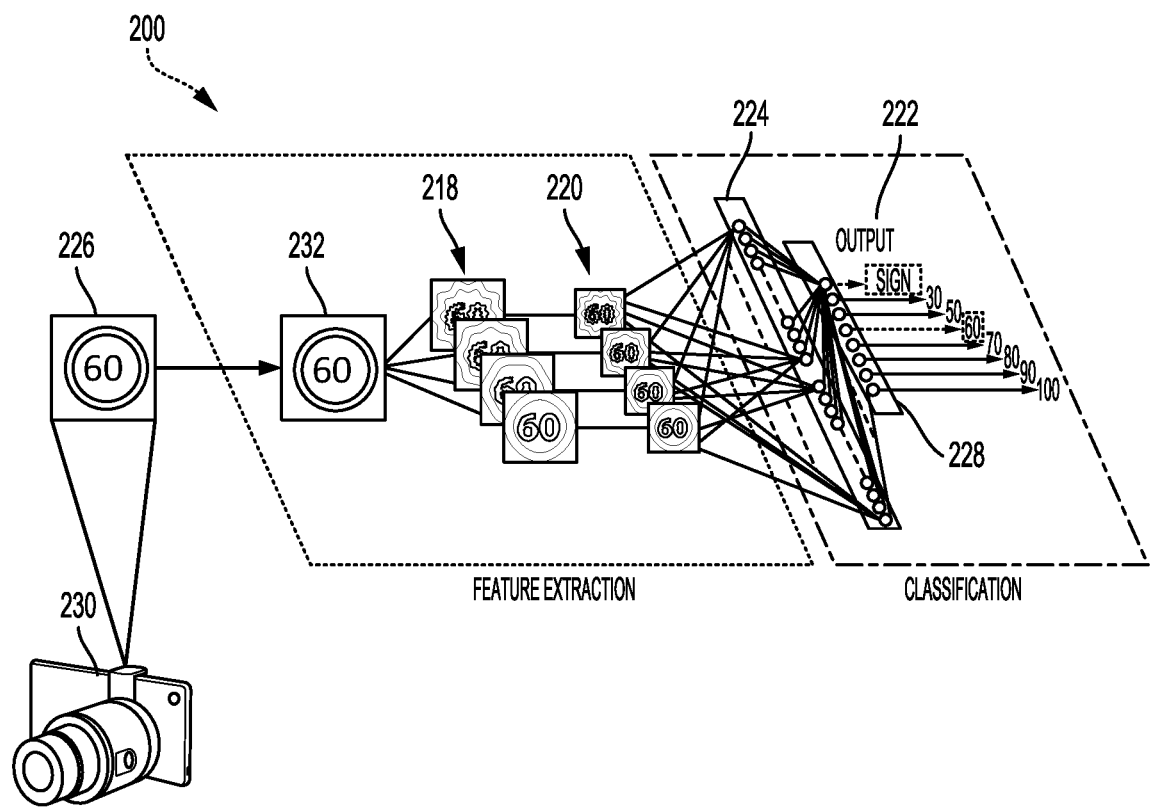
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters. According to aspects of the present disclosure said convolutional kernels may correspond to kernel operators that form nodes in the compute graph representation of the machine learning model.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep Convolutional Networks

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
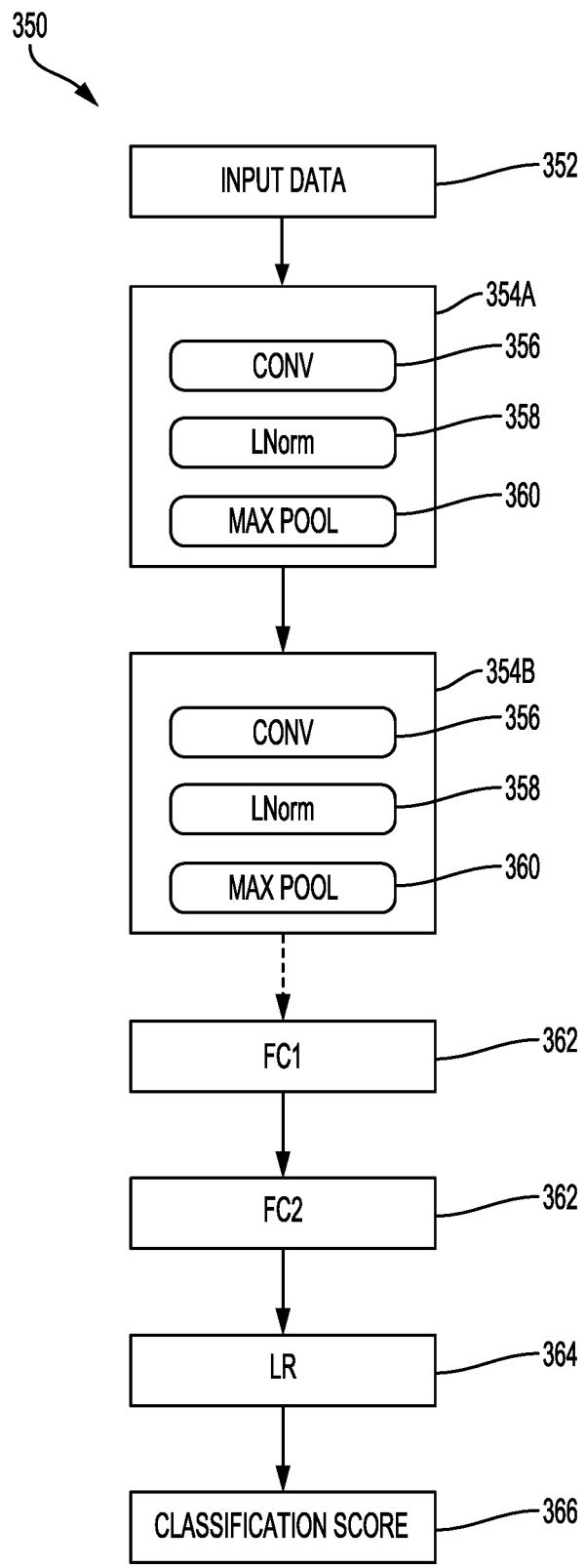
FIG. 3 is a block diagram illustrating an exemplary deep convolutional network (DCN), in accordance with aspects of the present disclosure.

FIG. 3 is a block diagram illustrating a deep convolutional network 350 that may form the basis for a machine learning model. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on the CPU 102 or GPU 104 of the SOC 100 to achieve high performance and low power consumption. In alternative embodiments, the parallel filter banks may be loaded on the DSP 106 or the ISP 116 of the SOC 100. In addition, the deep convolutional network 350 may access other processing blocks that may be present on the SOC 100, such as sensors 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Software Architecture for Implementing Machine Learning Functions on Device

Figure 4:
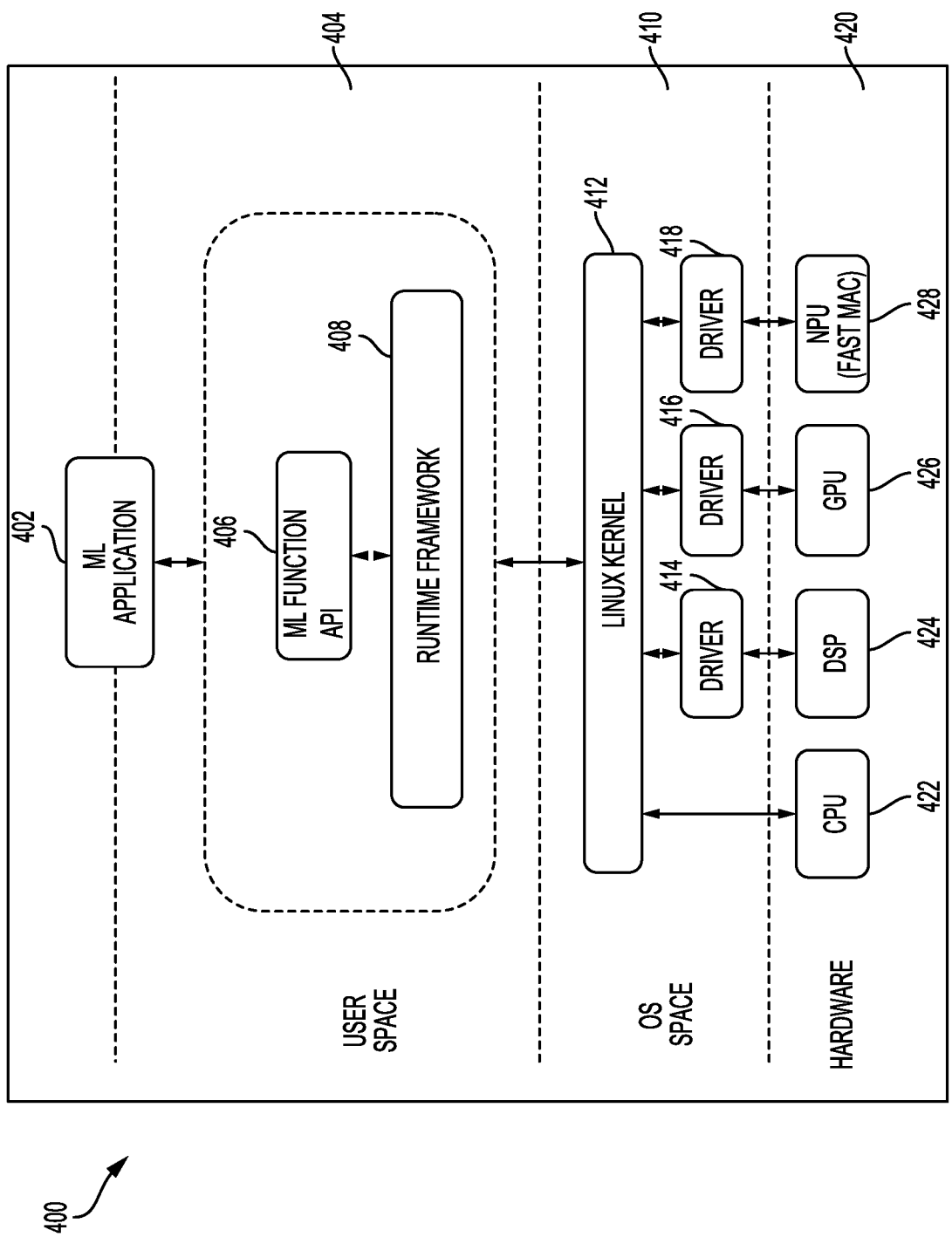
FIG. 4 is a block diagram illustrating an exemplary software architecture that may modularize machine learning model functions, in accordance with aspects of the present disclosure.

FIG. 4 is a block diagram illustrating an exemplary software architecture 400 that may modularize machine learning functions in accordance with the teachings of the present application. The software architecture may be implemented by at least one of the following: a target edge device, on which the machine learning model is to be executed, a controller for the distributed compiler optimization process or a compute node participating in the distributed compiler optimization process. Using the architecture, applications may be designed that may cause various processing blocks of an SOC 420 (for example a CPU 422, a DSP 424, a GPU 426 and/or an NPU 428) to support a distributed compiler optimization according to aspects of the present disclosure.

The machine learning application 402 may be configured to call functions defined in a user space 404 that may, for example, provide for the detection and recognition of a scene indicative of the location in which the device currently operates. The machine learning application 402 may, for example, configure a microphone and a camera differently depending on whether the recognized scene is an office, a lecture hall, a restaurant, or an outdoor setting such as a lake. The machine learning or ML application 402 may make a request to compiled program code associated with a library defined in a machine learning function application programming interface (API) 406. Said compiled program code may correspond to machine code that corresponds to a compiled version of the machine learning model created during the compiler optimization process or as a result thereof. The request by the ML application 402 may ultimately rely on the output of a deep neural network configured to provide an inference response based on video and positioning data, for example. Also, the request by the application 402 may be to a compiled program code associated with a library defined in a "SceneDetect" application programming interface (API) 406 to provide an estimate of the current scene. This request may then rely on the output of a differential neural network configured to provide scene estimates based on the video and positioning data, for example.

A run-time engine 408, which may be compiled code of a runtime framework, may be further accessible to the machine learning application 402. The machine learning application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Linux Kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

In one aspect, means for implementing the steps of the methods for optimizing the compilation of the machine learning model(s) as summarized above may be the CPU 102, program memory associated with the CPU 102, the dedicated memory block 118, fully connected layers 362, and or the routing connection processing unit 216 configured to perform the functions recited. In another configuration, the aforementioned means may be any module or any apparatus configured to perform the functions recited by the aforementioned means.

Compiler Optimization Strategies and Problem Statement

Running an inference using a trained machine learning model (such as those described above) on a processing system may involve a series of steps that are amenable to optimization. For example, in the context of neural network-based models, many layers of the model may need processing and the order and manner in which the layers are processed may be manipulated to address different key performance indicators (KPI)s, such as speed, accuracy, power use, and others.

One strategy, known as layer-based mapping, maps each layer of a neural network to a hardware resource so that the layer is processed completely by that resource prior to the next layer. Unfortunately, this strategy may require significant bandwidth as related data may need to be loaded and unloaded again and again throughout the processing of various layers. For example, in networks using large images as input data, intermediate data (e.g., activations and/or feature maps) may not fit in a local memory (e.g., local to the hardware resource), and hence they have to be unloaded to another memory, such as a host system memory (e.g., DDR). This issue is particularly acute for convolutional neural networks, where overlapping data is used for the convolutions. The significant memory bandwidth increases power usage, which may be a significant hindrance in mobile device applications. Further, the significant memory bandwidth may clog the various memory pathways, causing other processes to slow or stall on the host processing system.

Further yet, assigning a whole layer to a single hardware resource does not maximize parallelism of hardware resources, which may lead to fewer inferences per unit time (an example of a KPI). Edge devices often have a plurality of hardware resources, such as CPUs, GPUs, DSPs, NPUs, FPGAs, ASICs, and other custom hardware (and in some cases multiple hardware resources within the aforementioned higher-level hardware resources, such as multiple matrix processors on a given ASIC) that can be leveraged for running inferences on models. Better performance may be achieved by simultaneously leveraging these resources through improved parallelization.

During compilation of the machine learning model it is essential to find a binary machine code solution for the machine learning model that optimally leverages edge device resources. In accordance with aspects of the present disclosure, a graph-level based optimized mapping of kernel operators of a given machine learning model to hardware of an edge device is provided at the compiler stage. In order to find an optimal mapping the compiler operates on a compute graph representation of the machine learning model which does not necessarily assign a whole layer of a network to a single hardware resource, i.e., the representation does not treat a network layer as a basic unit, but according to aspects of the present disclosure each kernel operator is treated as a basic unit for finding a mapping solution to the compute graph given the hardware constraints.

Prior compiler optimization strategies focused on kernel-level optimization inside each kernel based on thread hardware architecture, i.e., these prior works attempted to optimize a mapping from instructions of a given machine learning kernel to hardware and, thus, treating each instruction of the kernel as a basic unit. The compiler optimization process according to aspects of the present disclosure, however, describes a graph-level based mapping and treats the kernel operator itself as a basic unit and it thereby differs from prior works in the field of compiler optimization such as AutoTVM and ProTuner, which focus on kernel optimization.

Figure 5:
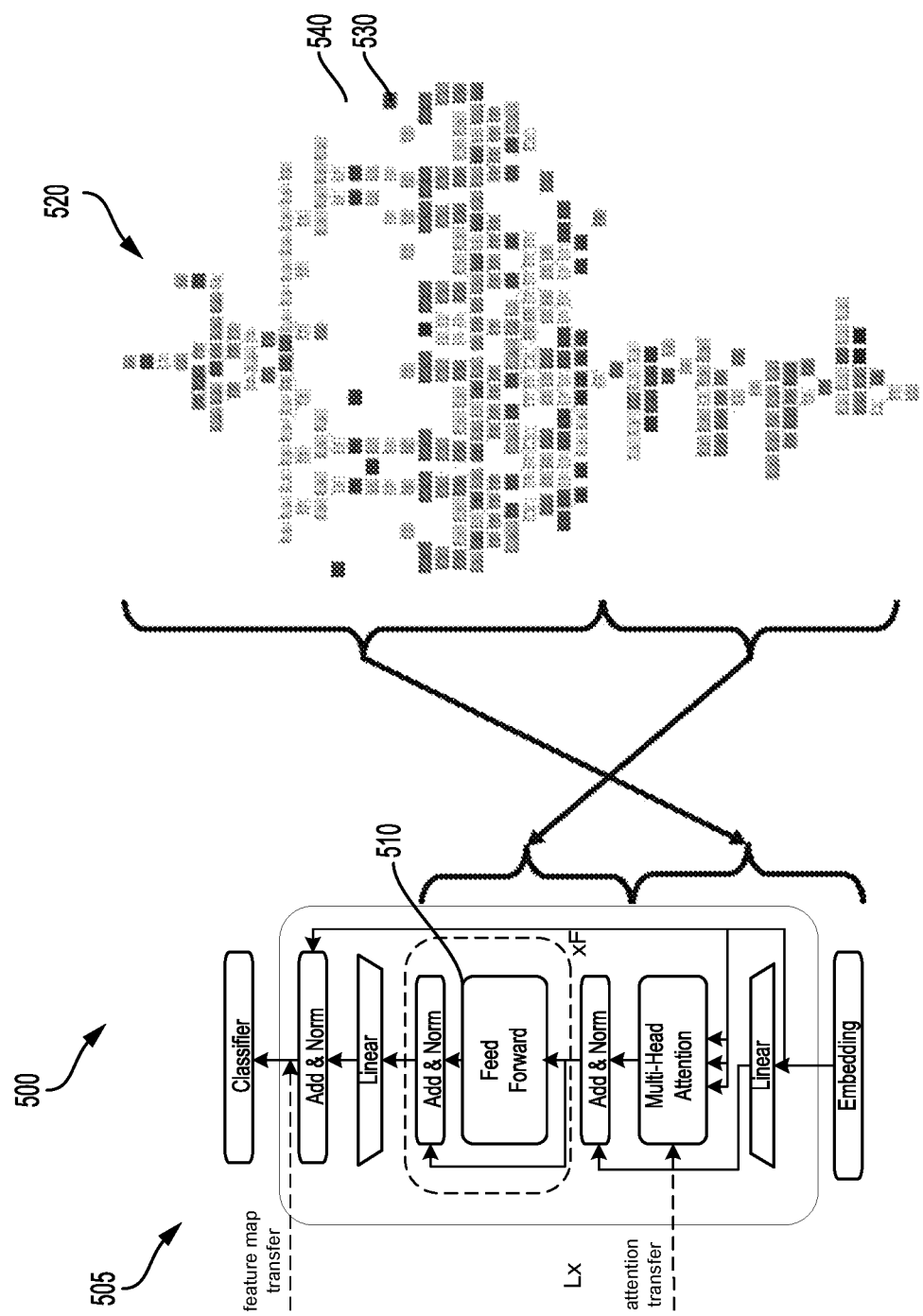
FIG. 5 is a diagram illustrating high-level representation of an example machine learning model and a compute graph representation thereof in accordance with aspects of the present disclosure.

FIG. 5 illustrates an exemplary compute graph generation for the compiler optimization process of the present application. The well-known Bidirectional Encoder Representations from Transformers (BERT) model for natural language processing (NLP) may be used as an example machine learning model. Specifically, the left side of FIG. 5 depicts the mobileBERT model, which is an optimized BERT model for mobile devices. Further information on mobileBERT can be found in the paper "MobileBERT: a Compact Task-Agnostic BERT for Resource-Limited Devices," Proceedings of the 58$^{th}$ Annual Meeting of the Association for Computational linguistics, pp. 2158-2170, 2020 by Z. Sun et al. However, it is noted that the present application is not limited thereto. On the left-hand side a high-level architecture visualization 505 of transformer blocks 510 of the BERT model 500 from the above paper is shown. On the right-hand side, a corresponding compute graph representation 520 of the BERT model is shown that has been generated by running a tiling process on the high-level representation 520 of the BERT model. Individual blocks of the compute graph 520 of the right-hand side are kernel operators 530 that are connected by edges 540. The compute graph 520 is a directed acyclic graph (DAG). The process of tiling a higher-level representation of a machine learning model as part of a compilation of a machine learning model to form a DAG is known to the skilled person. Different compilers might have different tiling algorithms.

Figure 6:
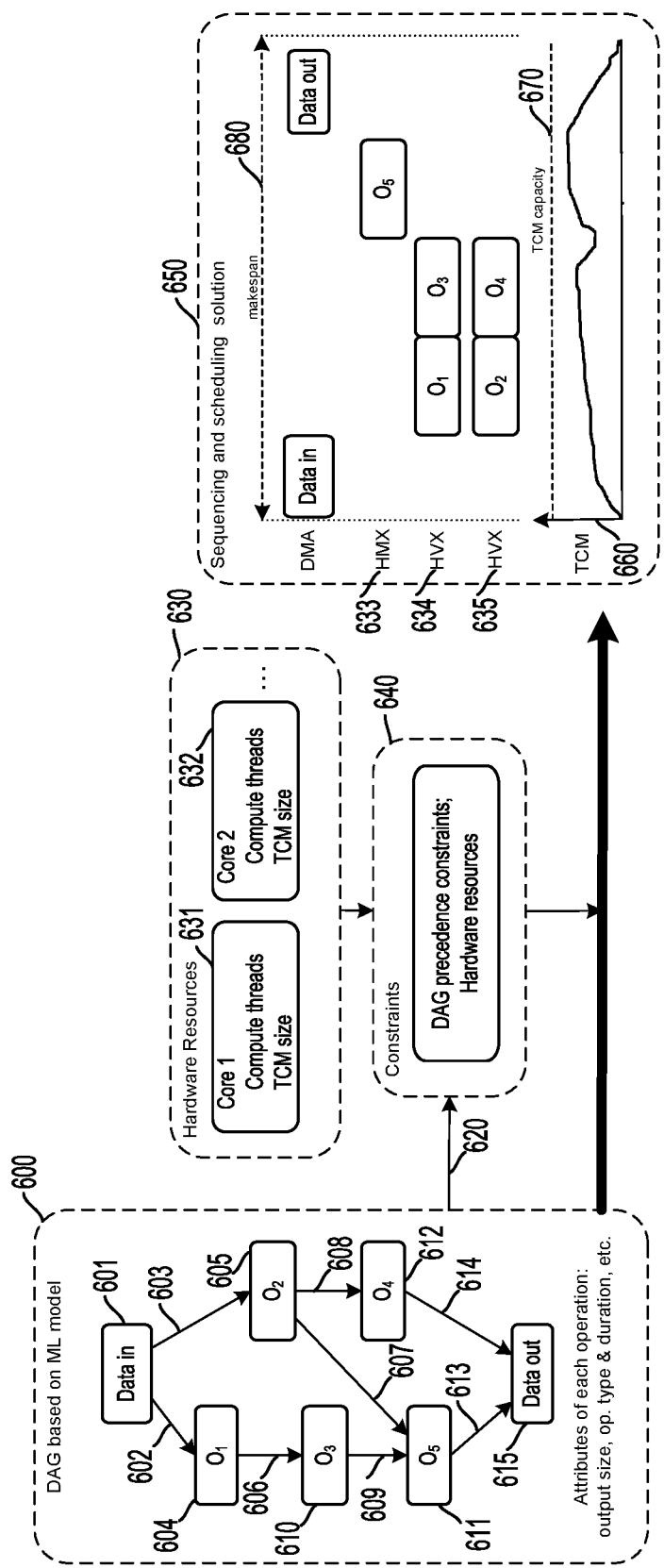
FIG. 6 is a diagram illustrating an exemplary constrained based generation of a sequencing and scheduling solution for a given compute graph in accordance with aspects of the present disclosure.

Aspects of the present disclosure focus on how to find a sequencing and scheduling solution for a DAG that was defined for a given machine learning model (such as the BERT model 500). The task of the compiler of a given machine learning model is to determine a sequencing and scheduling solution for such a DAG in terms of given constraints. FIG. 6 describes such a compiler task. In order to complete the compiler task, the compiler receives information representing the DAG 600 as well as hardware information 630 characterizing hardware resources of the heterogeneous compute environment at the target edge device, i.e., the edge device on which the machine learning model is to be executed.

The hardware information 630 may identify different processor cores 631, 632 in the SOC of the edge device, each processor core having associated memory (e.g., tightly coupled memory, TCM) and compute threads. Each processor core may thereby support one or more machine learning accelerator threads and the edge device, thus, may support a total predetermined number of machine learning accelerator threads. In the illustrated non-limiting example as shown in FIG. 6, the target edge device may support three machine learning accelerator threads 633, 634, 635. An implementation example regarding the hardware environment may be the Hexagon DSP chipset as distributed by the present applicant. In terms of the exemplary Hexagon DSP implementation, the machine learning accelerator threads may correspond to hexagon vector extensions, HVX, and/or hexagon matrix extension, HMX. Typically, for edge devices there is only a restricted amount of on-chip memory available, e.g., 4 MB or 8 MB.

As was shown in FIG. 5 the compute graph representation 520 may be made up of thousands of kernel operations 530 with precedence constraints to execute a given machine learning model. The precedence constraints define to some degree an order of succession among the kernel operations. In FIG. 6, exemplary DAG 600 for a given machine learning model has been simplified for illustrative purposes. Input data (i.e., data representing audio of spoken language or a to-be classified image) enters the compute graph at data in 601 and flows via edges 602, 603 to kernel operators 604, 605. Said kernel operator or compute kernel may be a routine compiled for high throughput accelerators (such as GPUs, DSPs or FPGAs) often separate from (but used by) a main program. Each kernel operator is associated with a set of attributes such as output size, operator type, duration, etc. Examples for such kernel operators are convolutional kernels with normalization and activation functions, tensor reshaping/transformation kernels, tensor splitting/concatenation etc.

A given layer of a neural network forming a machine learning model could be represented by multiple calls to one or more kernel operators following a tiling process applied to a higher-level representation of the machine learning model. The respective output of kernel operators 602, 603 is passed via edges 606, 607, 608 to respective kernel operators 610, 611 and 612. Kernel operator 611 receives as further input the output of kernel operator 610 via edge 609. Finally, kernel operators 611, 612 provide output data via edges 613, 614 to data out 615. Data that may be output at data out 615 may represent the inference result of the machine learning model given a particular data input.

A precedence constraint is represented in the DAG 600 by an arrow as part of the edge between two kernel operators. For example, the two kernel operators 605 and 611 are connected by a precedence constraint 607 since execution of Kernel operator 611 can only be started when Kernel operator 605 is finished, or at a later point in time. The compiler extracts the precedence constraint information 620 from the DAG 600, which forms together with the hardware information 630, compiler constraint information 640.

The compiler then determines in terms of the compiler constraint information 640 a sequencing and scheduling solution 650 for the DAG 600. The sequencing and scheduling solution 650 comprises a mapping of each kernel operator on a given machine learning accelerator thread 633, 634, 635. The mapping comprises a sequencing, i.e., a decision regarding the sequence (order of the operations) of the execution of the kernel operators and a scheduling, i.e., a decision which kernel operator to be executed on which machine learning accelerator thread 633, 634, 635. In FIG. 6, the exemplary solution 650 depicts in horizontal direction the allocation of the kernel operators to the machine learning accelerator threads 633, 634, 635 over time. Initially, the input data is in DMA (dynamic memory allocation). Next kernel operators 604, 605 are mapped in parallel to machine learning accelerator threads 634, 635, while machine learning accelerator thread 633 is idle. Subsequently, kernel operators 610, 612 are mapped in parallel to machine learning accelerator threads 634, 635, while machine learning accelerator thread 633 is still idle. Then, kernel operator 611 is mapped to machine learning accelerator thread 633, while machine learning accelerator threads 634 and 635 are idle. Finally, output data is written to dynamic memory allocation, DMA.

The solution space from which the compiler determines a sequencing and scheduling solution 650 is potential vast. And as will be discussed later, searching based algorithms, machine learning based algorithms or a combination of both may be employed to pick one or more solutions 650 from the solution space to derive a machine code for the machine learning model. In case a learning-based approach is employed to make inference performance of the given machine learning model better, a further machine learning model is trained to aid in optimization. But in this case, it is noted that the two machine learning models at hand are different: one for original input to the compiler and another one for aiding the optimization of the compiler.

Upon completion of the compiler task a machine code is available that describes the sequencing and scheduling solution 650 in terms of an executable low level binary code and said machine code is executed on a compute node to determine key performance indicators, KPIs, of said code. KPIs include for example inference per second (IPS), DDR read/write bandwidth, power consumption, memory (TCM) footprint, makespan, etc.

The bottom of the illustrated sequencing and scheduling solution 650 of FIG. 6 depicts for example the TCM usage 660 over time in terms of the entire available TCM capacity 670 (i.e., the TCM footprint) and at the top of the sequence and scheduling solution 650 the makespan 680, i.e., the time till completion of an inference with the executed machine language code is indicated. In particular, the makespan is a key performance indicator that can be employed to assess how efficient a compiled executable code employs the hardware resources to derive an inference for a machine language model on an edge device.

Distributed Compiler Optimization with Centralized Controller

Figure 7:
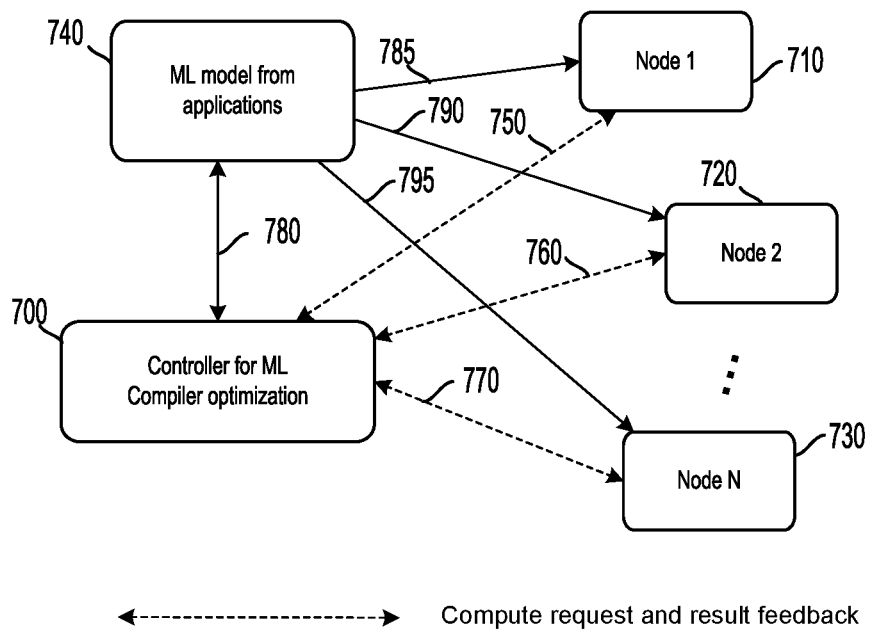
FIG. 7 is a block diagram illustrating a system for a distributed compiler optimization process in accordance with aspects of the present disclosure.

In accordance with aspects of the present disclosure a central controller 700 as depicted in FIG. 7 co-ordinates a distributed compiler optimization process that optimizes one or more KPIs of the model execution while satisfying constraints given in terms of the compiler constraint information 640. Since the solution space for the compiler task is potentially vast the complex optimization is distributed to a large amount of compute resources that is available on a plurality of compute nodes 710, 720, 730. For a given compiler optimization process, the controller 700 selects or allocates a subset of the plurality of compute nodes to participate in the optimization process. The compute nodes 710, 720, 730 as well as the controller 700 may have access to a representation of the machine learning model via an application 740. Said application may for example be apps on a smartphone, in a car or on other edge devices. The actual machine learning model from said application 740 may be a machine learning model for object detection, image classification/segmentation, etc. The application 740 may be the entity that translates the model to an optimization problem (e.g., a Markov Decision Process, MDP, as discussed later in the present disclosure). The controller 700 does not necessarily need to know the machine learning models, including model structure and weights, because this might be valuable/proprietary assets for each application 740. As such the problem formulation represents the optimization. The machine learning model is thereby abstracted in the modelled environment and the controller does not need to have the model information explicitly for managing the compiler optimization problem. In this case, the application 740 is not part of the controller 700, but on a separate device. However, in some embodiments the application 740 can be part of the controller 700 if there is no proprietary concern on the machine learning models.

As will be further explained the controller 700 initiates the distributed compiler optimization process by sending respective compute requests via communication links 750, 760, 770 to the selected subset of compute nodes 710, 720, 730 and receives from each of the participating computer nodes 710, 720, 730 result feedback in an initial round of optimization via said communication links 750, 760, 770. Said result feedback is analyzed by said controller 700 and potential further optimization rounds (which includes sending of further compute requests as well as collecting further feedback results) are scheduled until an optimal solution is identified. The optimal scheduling and sequencing solution is then reported back to application 740 via a communication link 780 for implementation at the target edge devices. In an alternative example, the controller may directly inform the target device with respect to the optimal solution.

Also, in accordance with a further aspect of the present application the plurality of computes nodes 710, 720, 730 comprises edge devices that have the heterogeneous compute environment as described in the hardware information 630. By utilizing the edge devices with the targeted heterogeneous compute environment in the distributed compiler optimizing process the actual hardware can be utilized when running the machine code (without complex or inaccurate modeling). Examples of an inaccurate modelling could be for example wrong assumptions on kernel operation duration, memory estimation due to segmentation, etc. In accordance with aspects of the present invention such wrong assumptions (and thus incomplete cost functions in compiler optimization) are avoided. It is noted that the number of accelerator threads and the size of the TCM is accelerator information, which is known by the compiler on the device.

These edge devices may or may not be target edge devices, i.e., devices that have the machine learning model implemented. If the edge devices are not target edge devices, the devices need to receive machine learning model information for modelling the environment via communication links 785, 790, 795. If the compute nodes are not edge devices, the compute nodes need to receive hardware information in order to model the heterogeneous compute environment.

Distributed Machine Learning Compiler Optimization for a Specific Compiler Instance (One Machine Learning Model and One Type of Target Device Hardware)

Figure 8:
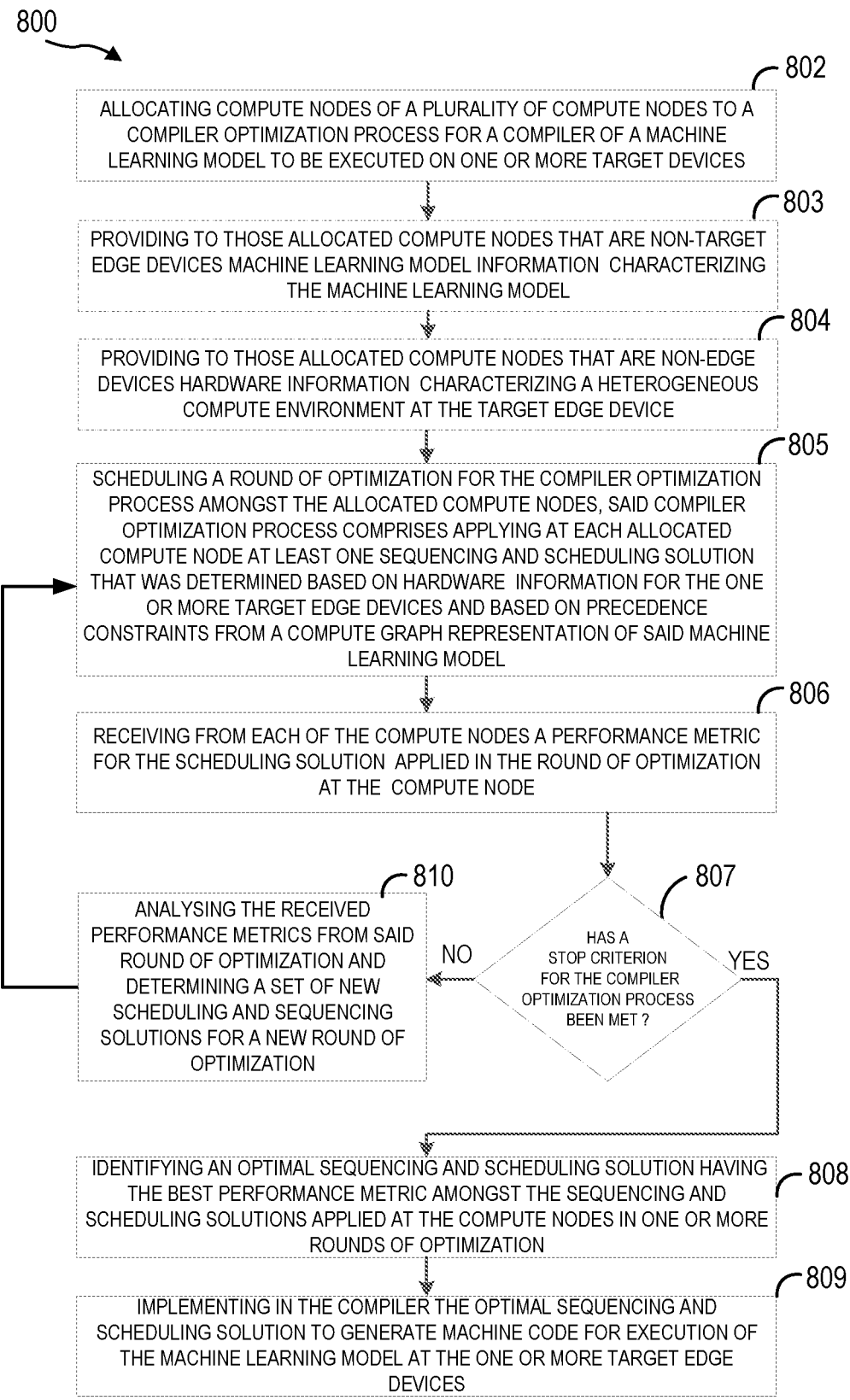
FIG. 8 is a flow diagram illustrating a method for a controller in a distributed compiler optimization process in accordance with aspects of the present disclosure.

In the following, the actions taken at the controller 700 for a compiler optimization process in accordance with aspects of the present disclosure are described with reference to the flow diagram in FIG. 8. The embodiment described with respect to FIG. 8 is for optimizing a given compiler instance that is defined by a pair of a machine learning model that is to be executed on one or more target devices and a target heterogeneous compute environment at an edge device. Said heterogeneous compute environment includes one or more machine learning accelerator threads as described in the context of FIG. 6. Initially, the controller 700 obtains from application 740 machine learning model information that characterizes said machine learning model and may also receive hardware information that characterises the heterogeneous compute environment at said edge device so as to set up the compiler.

At block 802 the controller 700 allocates compute nodes of said plurality of compute nodes 710, 720, 730 to the compiler optimization process for said compiler of said machine learning model. As discussed, said machine learning model is generated in a machine learning framework and has a compute graph representation corresponding to said machine learning model information. Nodes of said compute graph representation are kernel operators necessary to execute the machine learning model and edges of said compute graph representation connect said operators to define precedence constraints amongst the kernel operators.

In the optional block 803 the controller provides to one or more allocated compute nodes, which are non-target edge devices, machine learning model information. Alternatively, the application 740 provides said information to the non-target edge devices. In the optional block 804 the controller 700 provides one or more compute nodes, which are non-edge devices, with hardware resource information. Alternatively, the application 740 provides said information to the non-edge devices.

At block 805, the controller 700 schedules a round of optimization for the compiler optimization process amongst the allocated compute nodes 710, 720, 730. As part of the scheduling the controller 700 may send a compute request to each allocated node. Said compute request may identify a respective sequencing and scheduling solution 650 that is to be applied to each allocated compute node. Alternatively, the request may merely instruct the allocated compute node to identify itself a respective sequencing and scheduling solution 650 that is to be applied. The compute request may also comprise the actual machine code that corresponds to the compiled sequencing and scheduling solution 650 that the allocated compute node is requested to apply. Alternatively, each allocated compute node is provided with a parametrization of the respective sequencing and scheduling solution 650 to be applied prior to execution. While the allocated compute nodes may compile the machine code prior to execution, the nodes may also use an existing API to run the solution instead of compiling it again.

The sequencing and scheduling solution 650 for the kernel operators is determined based on hardware information 630 for the one or more target edge devices and the precedence constraints 620 from the compute graph representation of the machine learning model. As will be discussed, said determination may involve in accordance with aspects of the present disclosure various schemes, which include search-based and machine learning based schemes.

Each compute node then applies the identified sequencing and scheduling solution. Said applying comprises executing the machine code to run an inference of the machine learning model with the given identified sequencing and scheduling solution to obtain a performance metric for the executed compiled version of the machine learning model. If the compute node is a target edge device, the compute node may execute the machine code directly using the given hardware environment without any modelling. If the compute node is an edge-device—but not a target-edge device—the compute node simulates the requested computation based on a modelled environment using the machine learning model information. If the compute node is a non-edge device the compute node simulates the requested computation based on a modelled environment using the hardware information 630 and the machine learning model information provided by the controller.

At block 806 the controller 700 receives from each of the compute nodes 710, 720, 730 a performance metric for the respectively scheduling solution said was applied in the round of optimization at a respective compute node. At block 807 the controller 700 checks if a stop criterion for the compiler optimization process has been met. There are many feasible stop criterions that could be employed. The following non-limiting examples could be employed as a stop criterion: a pre-determined performance metric that is achieved, metric converged, max number of rounds is met, time limit is met, etc. If in block 807 the stop criterion is met, the controller 700 identifies at block 808 an optimal sequencing and scheduling solution having the best performance metric amongst the sequencing and scheduling solutions applied at the compute nodes in previous rounds of optimization.

At block 809 the controller 700 identifies an optimal sequencing and scheduling solution having the best performance metric amongst the sequencing and scheduling solutions applied so far at the compute nodes 710, 720, 730 (in said initial round of optimization or over all executed rounds of optimization), At block 810 the controller 700 implements in the compiler the optimal sequencing and scheduling solution to generate machine code for execution at the one or more target edge devices. Said step may comprise reporting the optimal sequencing and scheduling solution to application 740.

If at block 807 the controller 700 determines that a stop criterion for the compiler optimization process has not been met, the controller analyses the received performance metrics from said round of optimization and determines a set of new scheduling and sequencing solutions for a new round of optimization. The method then iterates back to block 805 and a new round of optimization is initiated with the determined set of new scheduling and sequencing solutions.

Figure 9:
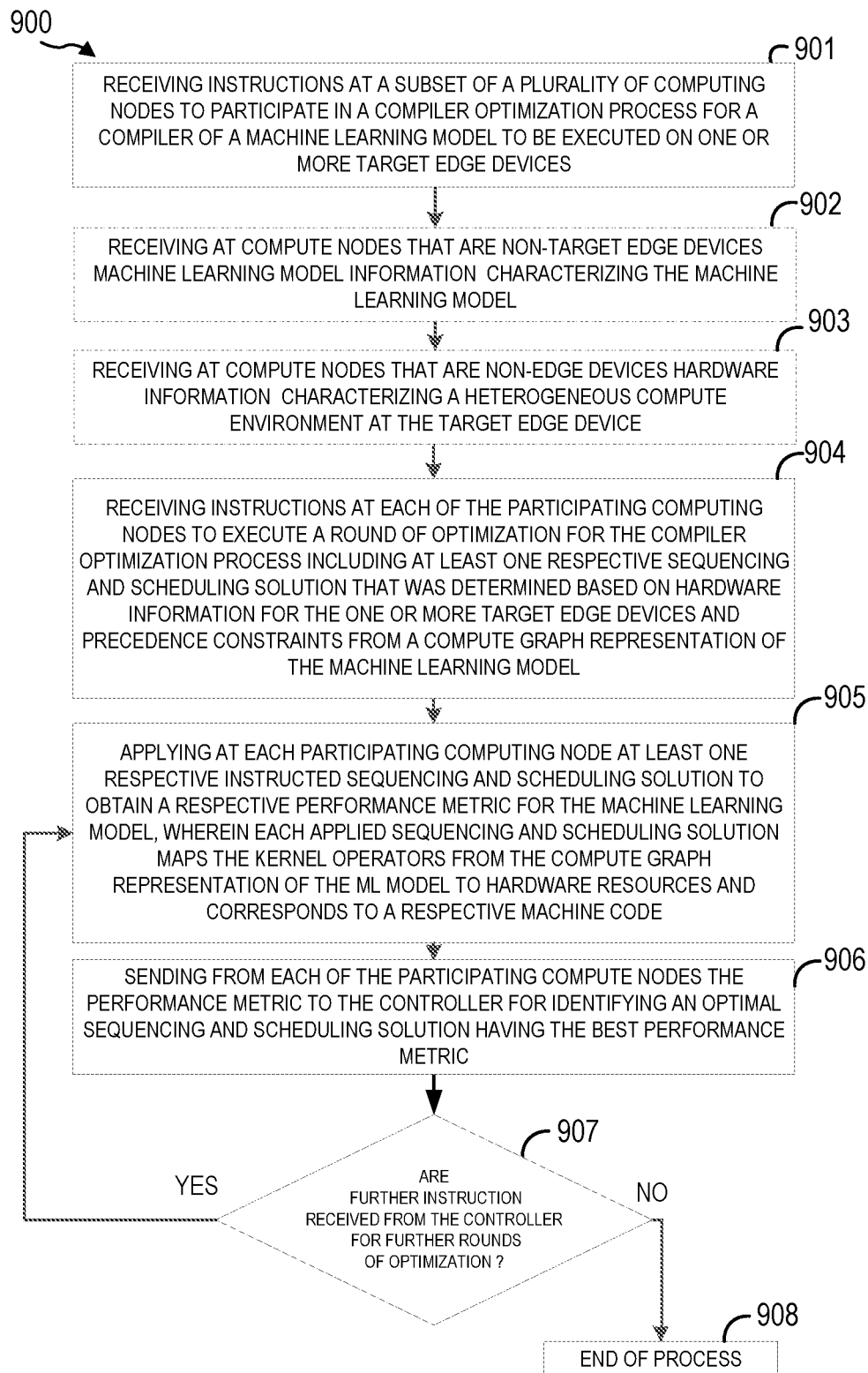
FIG. 9 is a flow diagram illustrating a method for compute nodes participating in a distributed compiler optimization process in accordance with aspects of the present disclosure.

The complementary actions taken at one of the compute nodes 710, 720, 730 for a compiler optimization process in accordance with aspects of the present disclosure are now described with reference to the flow diagram in FIG. 9. Again, the embodiment described with respect to FIG. 9 is for optimizing a given compiler instance that is defined by a pair of a machine learning model that is to be executed on one or more target devices and a target heterogeneous compute environment at an edge device. Said heterogeneous compute environment including one or more machine learning accelerator threads 634, 635, 633.

Initially, at block 901 a subset of a plurality of computing nodes 710, 720, 730 receive instructions to participate in a compiler optimization process for a compiler of a machine learning model. As previously discussed, said machine learning model being generated in a machine learning framework and having a compute graph representation forming machine learning model information, wherein nodes of said compute graph representation are kernel operators necessary to execute the machine learning model and edges of said compute graph representation connect said kernel operators to define precedence constraints amongst the kernel operators.

In the optional block 902 one or more participating compute nodes that are non-target edge devices receive machine learning model information from controller 700. Alternatively, the application 740 provides said information to the participating non-target edge devices. In the optional block 903 one or more participating compute nodes that are non-edge devices receive hardware resource information for modelling the heterogeneous compute environment at the target edge device. Alternatively, the application 740 provides said information to the participating non-edge devices.

At block 904, each of the participating computing nodes receive instructions to execute a round of optimization for the compiler optimization process including at least one respective sequencing and scheduling solution that was determined based on hardware information 630 for the one or more target edge devices and the precedence constraints. The respective instructions may include a compute request for each participating compute node. Said compute request may identify a respective sequencing and scheduling solution 650 that is to be applied at each participating compute node. Alternatively, the request may merely instruct the participating compute node to identify itself a respective sequencing and scheduling solution 650 that is to be applied. The compute request may also comprise the actual machine code that corresponds to the compiled sequencing and scheduling solution 650 that the participating compute node is requested to apply. Alternatively, each participating compute node is provided with a parametrization of the respective sequencing and scheduling solution 650 to be applied and compiles the machine code itself prior to execution thereof (or employs an existing API to run the solution instead).

At block 905 each participating computing node applies at least one respective sequencing and scheduling solution, wherein each applied sequencing and scheduling solution maps the kernel operators from the compute graph representation of the machine learning model to hardware resources and corresponds to a respective machine code. Said applying comprises executing the machine code to run an interference of the machine learning model with the given identified sequencing and scheduling solution on the compute node to obtain a performance metric for the executed compiled version of the machine learning model. If the compute node is a target edge device, the compute node may execute the machine code directly using the given hardware environment without any modelling. If the compute node is an edge-device—but not a target edge device—the compute node simulates the requested computation based on a modelled environment using the machine learning model information. If the compute node is a non-edge device the compute node simulates the requested computation based on a modelled environment using the hardware information and the machine learning model information provided by the controller.

At block 906 each of the participating compute nodes 710, 720, 730 sends said performance metric to the controller for identifying an optimal sequencing and scheduling solution having the best performance metric.

In decision block 907 the participating nodes await further instructions regarding the compiler optimization process. As discussed, the controller 700 checks if a stop criterion for the compiler optimization process has been met. If not, the controller analyses the received performance metrics from the round of optimization and determines a set of new scheduling and sequencing solutions for a new round of optimization and provides new instructions to the participating compute nodes 710, 720, 730. If the participating compute nodes receive said instructions, the method then proceeds back to block 905 and a new round of optimization is initiated with the determined set of new scheduling and sequencing solutions. If the participating nodes 710, 720, 730 do not receive new instructions within a predetermined time frame, it is assumed that the controller 700 has determined that a stop criterion for the compiler optimization process has been met and the process ends at block 908.

As mentioned above, the solution as described with respect to FIGS. 8 and 9 is for optimizing a machine learning compiler for a given compile instance defined by a pair of a given machine learning model and a given hardware environment (in particular a given machine learning accelerator hardware) at the target edge device. The discussed distributed optimization solution may be employed such that an improvement over time is achieved. For example, a quick (may not be the optimal) solution from existing heuristic may be used when compiling time budget is tight. The compiler optimization process as described above can be employed to come up with a new compilation with better performance (compared to a compilation based on said heuristics). Such new compilation is then generated and/or deployed incrementally.

Also, the process as described above may be implemented such that the distribution happens for each new compiler instance. In this case, the allocated distributed set of nodes could be for different compiler instances. In other words, if the same machine learning model is to be implemented on a different hardware environment a new distributed compiler optimization process is established with a new allocated set of nodes. Similarly, if a new machine learning model is to be implemented on the same edge devices (with the same hardware environment) again a new distributed compiler optimization process is established with a different set of allocated nodes.

Distributed Machine Learning Compiler Optimization for General Compiler

According to a further aspect of the present application the teachings of the present application can also be employed to construct a general compiler. In other words, the distributed optimization scheme as described with respect to FIGS. 8 and 9 can be adapted for targeting to build a general compiler that is not limited to a specific compiler instance.

While the optimizing scheme described earlier with respect to FIGS. 8 and 9 focused on a particular compiler instance corresponding to a combination of given machine learning model and a given hardware environment at a target edge device, the scheme as presented above can be generalized to a diverse set of target devices with different compiler instances, i.e., to a set of target devices implementing a plurality of machine learning models (with different compute graph representations) and having different types of heterogeneous compute environments (e.g., different number of accelerator threads, different amounts of memory, etc.).

In essence, the scheme described earlier may be executed for a given plurality of machine learning models and a given set of edge devices (characterized by respective hardware information) to build the general compiler, i.e., to optimize compiler components, compiler parameters and/or algorithms. Typical algorithms have a so called hyperparameter which could be tuned for better performance. A machine learning based method for deriving a general compiler could tune a learning rate, a model architecture, etc. When search-based methods are employed for building a general compiler an example is a genetic algorithm that could tune population size, elite size, inheritance probability, etc. As part of such scheme to build a general compiler the controller 700 initiates one or more rounds of optimization and asks the compute nodes to investigate—in said rounds of optimization—specific scheduling and sequencing solutions for specific machine learning models and for specific hardware environments. As described earlier the controller 700 collects results from each compute node, analyses said results and distributes further search tasks to the compute nodes, if necessary (i.e., if a stop criteria is not met). The compute nodes participating in the compiler optimization process for a general compiler need to know—in order to apply a given solution—the machine learning model that is to be tested and the target hardware (i.e., either modelled via hardware information for the respective target edge device of the diverse set of target devices or the compute node knows the target hardware, if the compute node is an edge device).

The controller continues to conduct rounds of optimization until said stop criteria is met and the general compiler design is fixed.

Also, for the described scenario of constructing a general compiler, the controller may again employ machine learning-based methods or searching-based methods, or a combination thereof to determine the sequencing and scheduling solutions that are to be investigated by the compute nodes in the distributed manner in the rounds of optimization.

For a generalized compiler, the distribution of the computing of the compiler optimization process happens only for the compiler optimization phase (and not over time as mentioned above in the context of the optimization scheme for a particular compiler instance). It is important to note that "general" means here that that the optimization is targeted to find some components, parameters algorithms that are statistically good for different machine learning models and machine learning accelerators (instead of optimal for a specific machine learning model and machine learning accelerator pair).

The general compiler may include optimizations that are for machine learning models and any accelerator hardware, e.g., parameter tuning, etc. In order to carry out these optimizations, the controller 700 either needs to know the accelerator models (i.e., the hardware information for the diverse set of target edge devices), if the goal is to optimize one set of parameters for each machine learning model or the controller 700 does not need to know said accelerator models, if the goal is to optimize one set of parameters for all models.

The controller could—as part of building a general compiler—focus on a set of machine learning models and hardware configurations that are representative, and try a set of parameters, collect results, and iterate. For machine learning based methods of constructing a general compiler the set of machine learning models (either real or synthetic models) is the data used for training.

If the controller uses a search-based method, there could be some parameters that are statistically good, and the optimization process can find them in this way. If the controller employs a machine learning based method, the controller could train for example a graph neural network to generate parameters. In this case, the compute nodes simply collect training rewards, and the controller 700 runs a gradient descent-based algorithm to optimize weights and biases and decides the solutions to try for the next iteration of the optimization process.

Once the optimized general compiler has been constructed, it is used directly afterwards to compile different machine learning models to machine code, which is then to be executed on the diverse set of target edge devices. When using the general compiler after the optimization, the system needs to know the machine learning model and accelerator pair as an input to then employ the general compiler to generate the executable machine code with the statistically optimized performance characteristics. The general compiler can, thus, be regarded as an extended look-up table that is used to look up a statistically optimal compilation for a given machine learning model X for a device having a given hardware Y.

Different Embodiments for Different Scenarios

The above-described distributed machine learning compiler optimization process with respect to a specific compiler instance as well as with respect to a general compiler can be employed in different scenarios, which are described in the following:

In accordance with a first embodiment, the distributed computation for the machine learning compiler optimization process takes place on edge devices. In other words, all compute nodes that are allocated by the controller 700 are edge devices that have the hardware environment of the target edge device. For the distributed deployment of the proposed method, in which compute nodes are edge devices, a first use case and a second use case can be distinguished.

In the first use case—corresponding to the method described in the context of FIGS. 8 and 9 and pertaining to optimizing for a specific compiler instance—the allocated compute nodes may on the one hand be a subset of the target edge devices using the compiler instance. In this scenario, the compute nodes already have the compiled machine learning model and the targeted machine learning accelerator for optimization and the compute nodes are ready to do for example some light computation at the background for the compiler optimization process inasmuch as they have the machine learning model information and the hardware information. On the other hand, the allocated compute nodes may not be a subset of target edge devices using the compiler instance. In this scenario the allocated compute nodes may need the representation of the problem for the optimization, i.e., they might require machine learning model information.

In the second use case—corresponding to the construction of a general compiler—the allocated edge device may be a diverse set of target edge devices with different compile instances, i.e., for different machine learning models and for different hardware configurations as discussed in the previous section.

In accordance with a second embodiment, the distributed computation for the machine learning compiler optimization process takes place on a cluster or on clouds, i.e., on non-edge devices. For this distributed deployment of the proposed method, the non-edge device compute nodes may or may not be on the same machine. For this embodiment each compute node has access to a modeled environment (i.e., is provided with machine learning model information and hardware information with respect to the one or more target edge devices for the compiler optimization process).

In accordance with a third embodiment, the computation for the compiler optimization process takes place on a local machine. In said centralized deployment of the proposed method, the controller 700 and compute nodes 710, 720, 730 are on the same computing machine and the compute nodes could for example correspond to respective processing cores on the local machine. Again, for this embodiment each compute node has access to a modeled environment i.e., each compute node is provided with machine learning model information and hardware information with respect to the one or more target edge devices for the compiler optimization process.

Common to these embodiments is that the application 740, the controller 700 and the compute nodes 710, 720, 730 fulfil the following tasks during the compile optimization process: the application 740 translates the compiler optimization problem for a given machine learning model to a specific algorithm such as a MDP, a parameter search, etc. The controller 700 coordinates the optimization and arranges one or more iterations or rounds of optimization based on said algorithm. In each round: the controller 700 assigns computations to compute nodes and collect results (i.e., performance metrics) from the compute nodes. It schedules further rounds of optimization based on the results. It should be noted that if the optimization takes place over a modeled environment, the controller 700 does not necessarily need to know the one or more machine learning models (including model structure and weights) itself. Such information might be valuable/proprietary assets for each application. The compute nodes 710, 720, 730 either simulate the requested computation based on modeled environment or run the inference of the machine learning model directly using on-device machine learning accelerator(s), if they are target edge devices.

Algorithm for Determining Sequencing and Scheduling Solutions

As discussed with respect to FIG. 6, the sequencing and scheduling solutions 650 for the kernel operators are determined based on hardware information for the one or more target edge devices and the precedence constraints from the compute graph representation of the machine learning model. The determination may involve in accordance with aspects of the present disclosure various schemes such as search-based and machine learning based schemes. With respect to search-based schemes, it is noted that for some machine learning models a sequencing and scheduling algorithm may exist and can be employed advantageously in accordance with aspects of the present disclosure. For example, a list scheduling algorithm, which requires predetermined priority, could be employed. Also, a depth-first or breath-first search could be employed, which requires a good tie breaking method.

However, these existing algorithms often require fine tuning of parameters of the algorithm to achieve good performance. The present compiler optimization scheme may then be simplified to a search through the parameter space of such existing algorithm. In this case, the controller 700 may need to know the set of adjustable parameters of the existing algorithm and can then proceed to allocate compute nodes to do the calculations iteratively based on the results. In this use example, the controller 700 does not necessarily need to know the one or more machine learning models. Examples in the category of search-based algorithms include for example evolutionary based black box search (e.g., genetic algorithm), random search, etc. The skilled person is familiar with these types of algorithms.

Regarding learning-based schemes, these methods include Monte Carlo tree search (MCTS), reinforcement learning, machine/deep learning, just to mention a few. As stated before a graph neural network to generate parameters for a general compiler could be employed.

In the following, the MCTS based solution will be described in more detail. MCTS is effective in a wide variety of sequential decision problems (e.g., in fast environmental simulation). It is a heuristic search algorithm for different types of decision processes. While the algorithm is known to the skilled person, aspects of the present disclosure advantageously employ the algorithm to translate the compiler optimization for a given machine learning model to a Markov Decision Problem, MDP. It may be particularly effective in long horizon scenarios with large state space but small action space. An MDP provides a mathematical framework for modeling decision making in situations where outcomes are partly random and partly under the control of a decision maker (in the present context the controller 700). The controller 700 may for example maintain the MCTS search tree, which tells at each point, which solution to further explore. MDPs are useful for studying optimization problems solved via dynamic programming.

Figure 10:
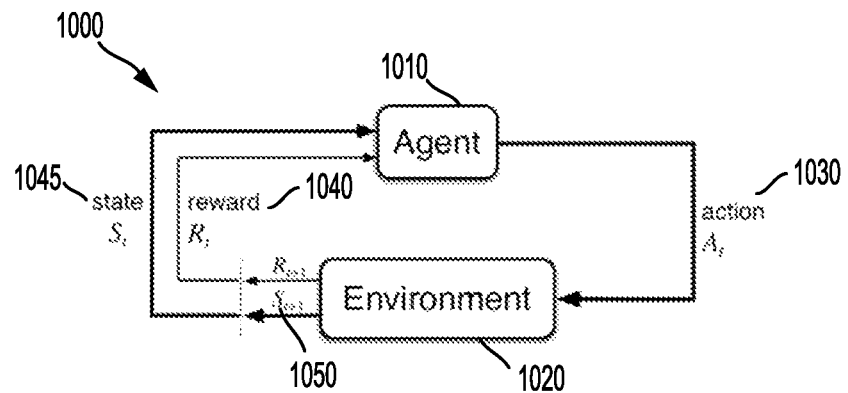
FIG. 10 is a diagram illustrating a Markov Decision Process, MDP, employed as part of a compiler optimization process in accordance with aspects of the present disclosure.

Broadly summarized, at each time step, the process is in some state s, and the decision maker (also called agent) may choose any action A that is available in state $s_t$. The process responds at the next time step by randomly moving into a new state $s_{t+1}$, and giving the decision maker a corresponding reward R. FIG. 10 summarizes a typical reinforcement learning cycle 1000 that is based on a MDP.

In a typical Reinforcement Learning (RL) problem, there is a learner and an agent 1010 and the surrounding with which it interacts is called environment 1020. The environment 1020, in return, provides rewards $R_t$ 1040 and a new state $s_{t+1}$ 1050 based on the actions $A_t$ 1030 of the agent. In RL, an agent is not taught how it should do something but it is presented with rewards $R_t$ (whether positive or negative) based on its actions.

In the context of the present disclosure the MDP (discussed further below) can be designed to avoid leaking machine learning model information.

Figure 11:
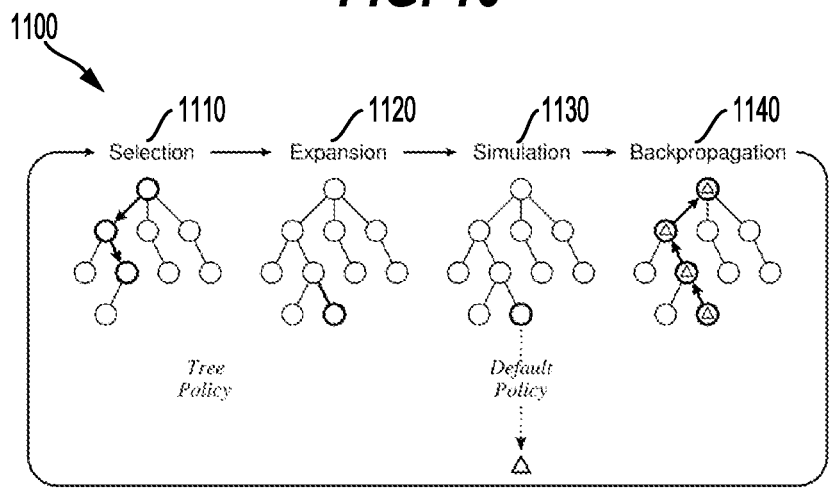
FIG. 11 is a diagram illustrating a Monte Carlo Tree Search, MCTS, employed in a distributed compiler optimization process in accordance with aspects of the present disclosure.

The present disclosure builds a search tree to optimize over the MDP. The MCTS search includes a process 1100, which is shown in FIG. 11 and can be summarized as follows:
Select 1110 to tradeoff exploitation and exploration.
Expand 1120 the search tree.
Evaluate or simulate 1130 value based on a given default/rollout policy.
Backup 1140 value and visit counts for node of the search tree and its ancestors.

Once the MCTS search is implemented by the controller 700 in the distributed compiler optimization process, some of the above four steps may be distributed to different compute nodes.

With reference back to FIG. 6, the problem of finding a sequencing and scheduling solution for a compute graph representation 600 (e.g., a DAG) of a given machine learning model can be translated as follows to an MDP:

Given a DAG, the follow representation G could be chosen for said compute graph $$G=(V,E,F) \qquad \text{Equ. 1}$$

In equ. 1, $V=\{v_1, \ldots, v_N\}$ is the set of nodes (or kernel operators such as e.g., kernel operator 604) in the DAG 600. The edges (such as e.g., edge 606 linking kernel operators 604 and 610) are defined as edge $(v_i, v_j) \in E$. Every node in the DAG is associated with node attributes $F(v_i)$. The following example attributes could be employed: outputSize, opDuration, opType.

The MDP state space is then defined as follows:

$$s_t=[S_G(t), S_V(t)], \forall v \in V \qquad \text{Equ. 2}$$

$S_G(t)$ defines in the above equ. 2 the graph-level state. It can have the following variables: HVX(Status), HMX(Status), TCM(Status), makespan, decisionTime, etc., wherein HVX and HMX are examples for machine learning accelerators in Applicant's Hexagon implementation. These variables are here used merely for exemplary purposes, but are not limiting.

$S_V(t)$ defines in the above equ. 2 the node-level state and can have for example the variable "isScheduled".

The action space for the MDP process is defined as $$p(a|s)=[p_1, \ldots, p_N, p_0]: \text{probability for the } N+1 \text{ possible actions} \qquad \text{Equ. 3}$$

In equ. 3, the term $p_{1:N}$ denotes the action of putting a kernel operation on the machine learning accelerator pool (e.g., HVX/HMX pool 633, 634, 635). The term Po denotes moving to the next decision time in the MDP. Whether an action is a "valid action" is state and algorithm dependent.

A state transition in the MDP can be defined as follows:
Action i, $i \in \{1, \ldots, N\}$: Said action results in scheduling kernel operation i and sets the variables isScheduled and HVX, HMX, TCM(alloc), makespan.

Action 0: said action results in moving to the next decision time. The following variables are set: HVX, HMX, TCM(dealloc), decisionTime.

Figure 12:
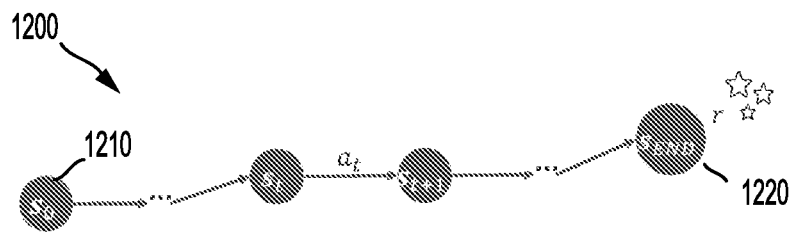
FIG. 12 is a diagram illustrating state changes in a MDP in accordance with aspects of the present disclosure.

FIG. 12 depicts the state transitions 1200 of the MDP process from a start state so 1210 to an end state Send 1220.

The reward in the MDP is defined in terms of a reduction in the overall processing time as follows:
makespan acceleration:

$$R = \frac{T_{sum}}{T} \qquad \text{Equ. 4}$$

In said equ. 4, variable T is the makespan following sequence of actions, $T_{sum}$ is the makespan of a fully serialized sequence. The defined acceleration is bounded as follows:

$$-1 \leq R \leq \text{\#threads} \qquad \text{Equ. 5}$$

Here $R \leq 0$ (i.e., a negative reward) implies that given constraints cannot be satisfied. The variable #threads is the number of machine learning accelerator threads and defines the upper bound of acceleration for the MDP reward.

The output of the MDP are the kernel operator sequencing and scheduling decisions. These decisions may form a run list for the machine learning accelerators in the heterogeneous compute environment and also may form the sequencing and scheduling solution 650 as discussed in the context of FIG. 6.

As indicated above, FIGS. 1-12 are provided as examples. Other examples may differ from what is described with respect to FIGS. 1-12.

In some aspects, the methods 800 and 900 may be performed by the SOC 100 (FIG. 1). That is, each of the elements of the methods 800, 900 may, for example, but without limitation, be performed by the SOC 100 or one or more processors (e.g., CPU 102) and/or other components included therein.

Implementation examples are provided in the following numbered clauses

1. A method for optimizing compilation of one or more machine learning models, wherein said machine learning model is to be executed on one or more target edge devices the method for a controller in communication with a plurality of compute nodes and comprising:
    allocating compute nodes of said plurality of compute nodes to a compiler optimization process for a compiler of said machine learning model, said machine learning model being generated in a machine learning framework and having a compute graph representation forming machine learning model information, wherein nodes of said compute graph representation are kernel operators necessary to execute the machine learning model and edges of said compute graph representation connect said kernel operators to define precedence constraints amongst the kernel operators;
    scheduling a round of optimization for the compiler optimization process amongst the allocated compute nodes, said compiler optimization process comprises applying at each allocated compute node at least one sequencing and scheduling solution that was determined based on hardware information for the one or more target edge devices and the precedence constraints, wherein each sequencing and scheduling solution maps the kernel operators upon hardware resources and upon compiling leads to execution on one of the compute nodes and results in a performance metric for the machine learning model;
    receiving from the compute nodes said performance metric for said round of optimization;
    identifying one or more sequencing and scheduling solutions having the best performance metric amongst the sequencing and scheduling solutions applied at the compute nodes; and
    implementing in the compiler the optimal sequencing and scheduling solution for generating machine code to execute the machine learning model on the one or more target edge devices.

2. The method of item 1, wherein there is a plurality of edge devices and wherein those edge devices of said plurality of edge devices that implement said one or more machine learning models are said target edge devices, each edge device of the plurality of edge devices having hardware resources in a heterogeneous compute environment characterized by said hardware information.

3. The method of item 2, wherein the plurality of compute nodes comprises a subset of the one or more target edge devices, a mix of target edge devices and non-target edge devices or no target edge devices, wherein said set of target edge devices have same hardware resources in the same heterogeneous compute environment,
    wherein, if there are non-target edge devices, said controller provides machine learning model information to those non-target edge devices to enable them to model a respective machine learning model during the compiler optimization process.

4. The method of item 2, wherein the plurality of compute nodes comprises a diverse set of the one or more target edge devices, wherein target edge devices of said diverse set of target edge devices have a plurality of different hardware resources in different heterogeneous compute environments characterized by device specific hardware information and implement a plurality of different machine learning models, said diverse set of edge devices using different compiler instances defined by a respective machine learning model and a respective heterogeneous compute environment on a target edge device.

5. The method of item 2, wherein the plurality of compute nodes is on a cluster or in a computing cloud, said method further comprising
    obtaining, at the controller, said hardware information:
    providing said hardware information and machine learning model information to the allocated compute nodes to enable them to model a given machine learning model on a target edge device environment for the compiler optimization process on said compute nodes.

6. The method of item 2, wherein the plurality of compute nodes and the controller are on a local machine, said method further comprising
    obtaining, at the controller, said hardware information:
    providing said hardware information and machine learning model information to the allocated compute nodes to enable them to model a given machine learning model on a target edge device environment for the compiler optimization process on said compute nodes.

7. The method of items 5 or 6, wherein the one or more target edge devices form a diverse set of target edge devices, wherein target edge devices of said diverse set of target edge devices have a plurality of different hardware resources in different heterogeneous compute environments characterized by device specific hardware information and implement a plurality of different machine learning models,
    wherein said diverse set of edge devices use different compiler instances defined by a respective machine learning model and a respective heterogeneous compute environment on a target edge device,
    said method comprising
    obtaining, at the controller, said specific hardware information including information regarding the different hardware configurations:
    providing to each of the allocated compute nodes respective hardware information as well as respective machine learning model information to enable them to model a respective machine learning model and a respective target edge device environment for the compiler optimization process on said compute nodes.

8. The method of item 1, wherein the hardware information comprises at least one of the following:
    number of computing cores at each target edge device;
    type and number of machine learning accelerator threads at each target edge device; and
    available memory at each target edge device.

9. The method of any of items 1 to 8, wherein the method further comprises checking, if a stop criterion for the compiler optimization process has been met, and, if not,
    analysing the performance metrics corresponding to the scheduling and sequencing solution from said round of optimization and identifying a set of new scheduling and sequencing solutions for a new round of optimization;
    scheduling a further round of optimization with said allocated compute nodes, wherein said compute nodes are assigned a respective one of the new scheduling and sequencing solutions for the further round of optimization;

receiving from the allocated compute nodes new performance metrics for said further round of optimization;

repeating said steps of analysing, scheduling and identifying until the stop criterion is met; and identifying said optimal sequencing and scheduling solution having the best performance metric amongst the sequencing and scheduling solutions applied at the compute nodes in the last round of optimization or over all rounds of optimization.

10. The method of items 4 or 7, wherein the compiler optimization process is initially executed for said machine learning model to derive a machine learning model specific optimal sequencing and scheduling solution, said method further comprising:

executing the compiler optimization process for the other machine learning models of said plurality of machine learning models and for various heterogeneous compute environments to derive a set of optimal sequencing and scheduling solutions, and constructing a general compiler from said set of optimal sequencing and scheduling solutions that is statistically good for said plurality of machine learning models and for different heterogeneous compute environments 11. The method of any of items 1 to 10, wherein the compiler optimization process to find an optimal sequencing and scheduling solution involves one of the following:

a machine learning based optimization algorithm;

a search based algorithm;

or a combination of both.

12. The method of item 11, wherein said machine learning based optimization algorithm comprises translating said compiler optimization for a given machine learning model in to a Markov decision process and applying a Monte Carlo tree search algorithm to identify the optimal sequencing and scheduling solution for a given pair of a machine learning model and a given heterogeneous compute environment at a target edge device.

13. The method of item 11, wherein said search based optimization algorithm comprises:

receiving information regarding adjustable parameters of an existing sequencing and scheduling algorithm for a graph-based compiler, said adjustable parameters defining a parameter space; and employing said existing sequencing and scheduling algorithm to generate sequencing and scheduling solutions spanning the parameter space and employing said generated sequencing and scheduling solutions for the one or more rounds of optimization.

14. A method for optimizing compilation of one or more machine learning models, wherein said machine learning model is to be executed on one or more target edge devices, the method for a plurality of computing nodes and comprising:

receiving instructions at each of the plurality of computing nodes to participate in a compiler optimization process for a compiler of said machine learning model, said machine learning model being generated in a machine learning framework and having a compute graph representation forming machine learning model information, wherein nodes of said compute graph representation are kernel operators necessary to execute the machine learning model and edges of said compute graph representation connect said kernel operators to define precedence constraints amongst the kernel operators;

receiving instructions at each of the plurality of computing nodes to execute a round of optimization for the compiler optimization process including at least one respective sequencing and scheduling solution that was determined based on hardware information for the one or more target edge devices and the precedence constraints, applying at each computing node said at least one respective sequencing and scheduling solution, wherein each applied sequencing and scheduling solution maps the kernel operators to hardware resources and corresponds to a respective machine code which upon execution on the computing nodes results in a respective performance metric for the machine learning model;

sending said performance metric from each of the compute nodes to the controller for identifying an optimal sequencing and scheduling solution having the best performance metric amongst the applied sequencing and scheduling solutions, and for implementing in the compiler the optimal sequencing and scheduling solution for executing the machine learning model on the one or more target edge devices.

15. The method of item 14, wherein there is a plurality of edge devices and wherein those edge devices of said plurality of edge devices that implement said one or more machine learning models are said target edge devices, each edge device of the plurality of edge devices having hardware resources in a heterogeneous compute environment characterized by said hardware information.

16. The method of item 15, wherein the plurality of compute nodes comprises a subset of the one or more target edge devices, a mix of target edge devices and non-target edge devices or no target edge devices, wherein said set of target edge devices have same hardware resources in the same heterogeneous compute environment, wherein, if there are non-target edge devices, said controller providing machine learning model information to those non-target edge devices to enable them to model a respective machine learning model during the compiler optimization process.

17. The method of item 15, wherein the plurality of compute nodes comprises a diverse set of the one or more target edge devices, wherein target edge devices of said diverse set of target edge devices have a plurality of different hardware resources in different heterogeneous compute environments characterized by device specific hardware information and implement a plurality of different machine learning models, said diverse set of edge devices using different compiler instances defined by a respective machine learning model and a respective heterogeneous compute environment on an target edge device.

18. The method of item 15, wherein the plurality of compute nodes are on a cluster or in a computing cloud, said method further comprising receiving said hardware information and machine learning model information at the allocated compute nodes to enable them to model a given machine learning model on a target edge device environment for the compiler optimization process on said compute nodes.

19. The method of item 15, wherein the plurality of compute nodes and the controller are on a local machine, said method further comprising receiving said hardware information and machine learning model information at the allocated compute nodes to enable them to model a given machine learning model on a target edge device environment for the compiler optimization process on said compute nodes.

20. The method of items 18 or 19, wherein the one or more target edge devices form a diverse set of target edge devices, wherein target edge devices of said diverse set of target edge devices have a plurality of different hardware resources in different heterogeneous compute environments characterized by device specific hardware information and implement a plurality of different machine learning models, wherein said diverse set of edge devices use different compiler instances defined by a respective machine learning model and a respective heterogeneous compute environment on a target edge device,
said method comprising
receiving at each of the allocated compute nodes respective hardware information as well as respective machine learning model information to enable them to model a respective machine learning model and a respective target edge device environment for the compiler optimization process on said nodes.

21. The method of item 1, wherein the hardware information comprises at least one of the following:
number of computing cores at each target edge device
type and number of machine learning accelerator threads at each target edge device; and
available memory at each target edge device.

22. The method of any of items 14 to 21, wherein the method further comprises
receiving instructions at the plurality of computing nodes to execute a set of new scheduling and sequencing solutions for a new round of optimization in a further round of optimization following an analysis of the performance metrics corresponding to the scheduling and sequencing solution from said initial round of optimization;
applying at each computing node at least one of the sequencing and scheduling solution for the new set of scheduling and sequencing solutions thereby generating a respective new performance metric for the machine learning model;
sending said new performance metric to the controller for identifying said optimal sequencing and scheduling solution having the best performance metric amongst the applied sequencing and scheduling solutions,
repeating said steps of receiving instructions for new rounds of optimization, executing new sequencing and scheduling solutions and sending new performance metrics until a stop criterion is met.

23. The method of items 17 or 20, wherein the compiler optimization process is initially executed for said machine learning model to derive a machine learning model specific optimal sequencing and scheduling solution, wherein said method further comprising:
receiving at the compute nodes instructions to execute sequencing and scheduling solutions for other machine learning models of said plurality of machine learning models and for various heterogeneous compute environments;
reporting performance metrics for these solutions to the controller for deriving a set of optimal sequencing and scheduling solutions and for constructing a general compiler from said set of optimal sequencing and scheduling solutions that is statistically good for said plurality of machine learning models and for different heterogeneous compute environments 24. A controller for optimizing compilation of one or more machine learning models, wherein said machine learning model is to be executed on one or more target edge devices, said controller in communication with a plurality of compute nodes and comprising: a processor configured to
allocate compute nodes of said plurality of compute nodes to a compiler optimization process for a compiler of said machine learning model, said machine learning model being generated in a machine learning framework and having a compute graph representation forming machine learning model information, wherein nodes of said compute graph representation are kernel operators necessary to execute the machine learning model and edges of said compute graph representation connect said kernel operators to define precedence constraints amongst the kernel operators;
schedule a round of optimization for the compiler optimization process amongst the allocated compute nodes, said compiler optimization process comprises applying at each allocated compute node at least one sequencing and scheduling solution that was determined based on hardware information for the one or more target edge devices and the precedence constraints, wherein each sequencing and scheduling solution maps the kernel operators upon hardware resources and upon compiling leads to execution on one of the compute nodes and results in a performance metric for the machine learning model;
receive from the compute nodes said performance metric for said round of optimization;
identify one or more sequencing and scheduling solutions having the best performance metric amongst the sequencing and scheduling solutions applied at the compute nodes; and implement in the compiler the optimal sequencing and scheduling solution for generating machine code to execute the machine learning model on the one or more target edge devices.

25. The controller of item 22, wherein the controller is one of the target edge devices.

26. The controller of item 22, wherein the controller is configured to communicate with the compute nodes in a wireless communication system, wherein each of said target edge devices is a user equipment in said wireless communication system and wherein said controller is located in a server on the network side of the wireless communication system 27. The controller of item 22, wherein the hardware information comprises at least one of the following:
number of computing cores at each target edge device;
type and number of machine learning accelerator threads at each target edge device; and
available memory at each target edge device.

28. The controller of item 22, wherein the processor is further configured to check, if a stop criterion for the compiler optimization process has been met, and, if not, analyse the performance metrics corresponding to the scheduling and sequencing solution from said round of optimization and identifying a set of new scheduling and sequencing solutions for a new round of optimization;
schedule a further round of optimization with said allocated compute nodes, wherein said compute nodes are assigned a respective one of the new scheduling and sequencing solutions for the further round of optimization;
receive from the allocated compute nodes new performance metrics for said further round of optimization;
repeat said steps of analysing, scheduling and identifying until the stop criterion is met; and
identify said optimal sequencing and scheduling solution having the best performance metric amongst the sequencing and scheduling solutions applied at the compute nodes in the last round of optimization or over all rounds of optimization.

29. A system of plurality of compute nodes for optimizing compilation of one or more machine learning models, wherein said machine learning model is to be executed on one or more target edge devices, said plurality of compute nodes in communication with a controller and each node comprising:

a processor configured to
receive instructions to participate in a compiler optimization process for a compiler of said machine learning model, said machine learning model being generated in a machine learning framework and having a compute graph representation forming machine learning model information, wherein nodes of said compute graph representation are kernel operators necessary to execute the machine learning model and edges of said compute graph representation connect said kernel operators to define precedence constraints amongst the kernel operators;
receive instructions to execute a round of optimization for the compiler optimization process including at least one respective sequencing and scheduling solution that was determined based on hardware information for the one or more target edge devices and the precedence constraints,
applying said at least one respective sequencing and scheduling solution, wherein each applied sequencing and scheduling solution maps the kernel operators to hardware resources and corresponds to a respective machine code which upon execution on the computing nodes results in a respective performance metric for the machine learning model;
send said performance metric to the controller for identifying an optimal sequencing and scheduling solution having the best performance metric amongst the applied sequencing and scheduling solutions, and for implementing in the compiler the optimal sequencing and scheduling solution for executing the machine learning model on the one or more target edge devices.

30. The system of item 29, wherein the of compute nodes are configured to communicate with the controller in a wireless communication system, wherein each of said target edge devices is a user equipment in said wireless communication system and wherein said controller is located in a server on the network side of the wireless communication system The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for optimizing compilation of one or more machine learning models, wherein a machine learning model of said one or more machine learning models is to be executed on one or more target edge devices, the method for a controller in communication with a plurality of compute nodes and comprising:
   allocating compute nodes of said plurality of compute nodes to a compiler optimization process for a compiler of said machine learning model, said machine learning model being generated in a machine learning framework and having a compute graph representation forming machine learning model information, wherein nodes of said compute graph representation are kernel operators necessary to execute the machine learning model and edges of said compute graph representation connect said kernel operators to define precedence constraints amongst the kernel operators;
   scheduling a round of optimization for the compiler optimization process amongst the allocated compute nodes, said compiler optimization process comprises applying at each allocated compute node at least one sequencing and scheduling solution that was determined based on hardware information for the one or more target edge devices and the precedence constraints, wherein each sequencing and scheduling solution maps the kernel operators upon hardware resources and upon compiling leads to execution on one of the compute nodes and results in a performance metric for the machine learning model;
   receiving from the compute nodes said performance metric for said round of optimization;
   identifying an optimal sequencing and scheduling solution having a best performance metric amongst the sequencing and scheduling solutions applied at the compute nodes; and
   implementing in the compiler the optimal sequencing and scheduling solution for generating machine code to execute the machine learning model on the one or more target edge devices.

2. The method of claim 1, wherein there is a plurality of edge devices and wherein those edge devices of said plurality of edge devices that implement said one or more machine learning models are said one or more target edge devices, each edge device of the plurality of edge devices having hardware resources in a heterogeneous compute environment characterized by said hardware information.

3. The method of claim 2, wherein the plurality of compute nodes comprises a subset of the one or more target edge devices, a mix of target edge devices and non-target edge devices or no target edge devices, wherein said subset of the one or more target edge devices have same hardware resources in a same heterogeneous compute environment,
   wherein, if there are non-target edge devices, said controller provides machine learning model information to those non-target edge devices to enable them to model a respective machine learning model during the compiler optimization process.

4. The method of claim 2, wherein the plurality of compute nodes comprises a diverse set of the one or more target edge devices, wherein target edge devices of said diverse set of the one or more target edge devices have a plurality of different hardware resources in different heterogeneous compute environments characterized by device specific hardware information and implement a plurality of different machine learning models,
   said diverse set of the one or more target edge devices using different compiler instances defined by a respective machine learning model and a respective heterogeneous compute environment on a target edge device.

5. The method of claim 2, wherein the plurality of compute nodes is on a cluster or in a computing cloud, said method further comprising
   obtaining, at the controller, said hardware information:
   providing said hardware information and machine learning model information to the allocated compute nodes to enable them to model a given machine learning model on a target edge device environment for the compiler optimization process on said compute nodes.

6. The method of claim 2, wherein the plurality of compute nodes and the controller are on a local machine, said method further comprising
   obtaining, at the controller, said hardware information:
   providing said hardware information and machine learning model information to the allocated compute nodes to enable them to model a given machine learning model on a target edge device environment for the compiler optimization process on said compute nodes.

7. The method of claim 5, wherein the one or more target edge devices form a diverse set of target edge devices, wherein target edge devices of said diverse set of target edge devices have a plurality of different hardware resources in different heterogeneous compute environments characterized by device specific hardware information and implement a plurality of different machine learning models,
   wherein said diverse set of target edge devices use different compiler instances defined by a respective machine learning model and a respective heterogeneous compute environment on a target edge device,
   said method comprising
   obtaining, at the controller, said device specific hardware information including information regarding different hardware configurations:
   providing to each of the allocated compute nodes respective hardware information as well as respective machine learning model information to enable them to model a respective machine learning model and a respective target edge device environment for the compiler optimization process on said compute nodes.

8. The method of claim 1, wherein the hardware information comprises at least one of the following:
   number of computing cores at each target edge device;
   type and number of machine learning accelerator threads at each target edge device; and
   available memory at each target edge device.

9. The method of claim 1, wherein the method further comprises
   checking, if a stop criterion for the compiler optimization process has been met, and, if not,
      analysing the performance metrics corresponding to the scheduling and sequencing solution from said round of optimization and identifying a set of new scheduling and sequencing solutions for a new round of optimization;
      scheduling a further round of optimization with said allocated compute nodes, wherein said compute nodes are assigned a respective one of the new scheduling and sequencing solutions for the further round of optimization;
receiving from the allocated compute nodes new performance metrics for said further round of optimization;
repeating said steps of analysing, scheduling and identifying until the stop criterion is met; and
identifying said optimal sequencing and scheduling solution having the best performance metric amongst the sequencing and scheduling solutions applied at the compute nodes in the last round of optimization or over all rounds of optimization.

10. The method of claim 4, wherein the compiler optimization process is initially executed for said machine learning model to derive a machine learning model specific optimal sequencing and scheduling solution, said method further comprising:
executing the compiler optimization process for other machine learning models of said one or more machine learning models and for various heterogeneous compute environments to derive a set of optimal sequencing and scheduling solutions, and
constructing a general compiler from said set of optimal sequencing and scheduling solutions that is statistically good for said one or more machine learning models and for different heterogeneous compute environments.

11. The method of claim 1, wherein the compiler optimization process to find an optimal sequencing and scheduling solution involves one of the following:
a machine learning based optimization algorithm;
a search based algorithm;
or a combination of both.

12. The method of claim 11, wherein said machine learning based optimization algorithm comprises translating said compiler optimization process for a given machine learning model in to a Markov decision process and applying a Monte Carlo tree search algorithm to identify the optimal sequencing and scheduling solution for a given pair of a machine learning model and a given heterogeneous compute environment at a target edge device.

13. The method of claim 11, wherein said search based algorithm comprises:
receiving information regarding adjustable parameters of an existing sequencing and scheduling algorithm for a graph-based compiler, said adjustable parameters defining a parameter space; and
employing said existing sequencing and scheduling algorithm to generate sequencing and scheduling solutions spanning the parameter space and employing said generated sequencing and scheduling solutions for the one or more rounds of optimization.

14. A method for optimizing compilation of one or more machine learning models, wherein a machine learning model of said one or more machine learning models is to be executed on one or more target edge devices, the method for a plurality of computing nodes and comprising:
receiving instructions at each of the plurality of computing nodes to participate in a compiler optimization process for a compiler of said machine learning model, said machine learning model being generated in a machine learning framework and having a compute graph representation forming machine learning model information, wherein nodes of said compute graph representation are kernel operators necessary to execute the machine learning model and edges of said compute graph representation connect said kernel operators to define precedence constraints amongst the kernel operators;
receiving instructions at each of the plurality of computing nodes to execute a round of optimization for the compiler optimization process including at least one respective sequencing and scheduling solution that was determined based on hardware information for the one or more target edge devices and the precedence constraints,
applying at each computing node said at least one respective sequencing and scheduling solution, wherein each applied sequencing and scheduling solution maps the kernel operators to hardware resources and corresponds to a respective machine code which upon execution on the computing nodes results in a respective performance metric for the machine learning model;
sending said respective performance metric from each of the computing nodes to a controller for identifying an optimal sequencing and scheduling solution having a best performance metric amongst the applied sequencing and scheduling solutions, and for implementing in the compiler the optimal sequencing and scheduling solution for executing the machine learning model on the one or more target edge devices.

15. The method of claim 14, wherein there is a plurality of edge devices and wherein those edge devices of said plurality of edge devices that implement said one or more machine learning models are said one or more target edge devices, each edge device of the plurality of edge devices having hardware resources in a heterogeneous compute environment characterized by said hardware information.

16. The method of claim 15, wherein the plurality of computing nodes comprises a subset of the one or more target edge devices, a mix of target edge devices and non-target edge devices or no target edge devices, wherein said subset of the one or more target edge devices have same hardware resources in a same heterogeneous compute environment,
wherein, if there are non-target edge devices, said controller providing machine learning model information to those non-target edge devices to enable them to model a respective machine learning model during the compiler optimization process.

17. The method of claim 15, wherein the plurality of computing nodes comprises a diverse set of the one or more target edge devices, wherein target edge devices of said diverse set of the one or more target edge devices have a plurality of different hardware resources in different heterogeneous compute environments characterized by device specific hardware information and implement a plurality of different machine learning models,
said diverse set of the one or more target edge devices using different compiler instances defined by a respective machine learning model and a respective heterogeneous compute environment on an target edge device.

18. The method of claim 15, wherein the plurality of computing nodes are on a cluster or in a computing cloud, said method further comprising
receiving said hardware information and machine learning model information at the computing nodes to enable them to model a given machine learning model on a target edge device environment for the compiler optimization process on said compute nodes.

19. The method of claim 15, wherein the plurality of computing nodes and the controller are on a local machine, said method further comprising
receiving said hardware information and machine learning model information at the computing nodes to enable them to model a given machine learning model on a target edge device environment for the compiler optimization process on said computing nodes.

20. The method of claim 18, wherein the one or more target edge devices form a diverse set of target edge devices, wherein target edge devices of said diverse set of target edge devices have a plurality of different hardware resources in different heterogeneous compute environments characterized by device specific hardware information and implement a plurality of different machine learning models,
wherein said diverse set of target edge devices use different compiler instances defined by a respective machine learning model and a respective heterogeneous compute environment on a target edge device, said method comprising
receiving at each of the computing nodes respective hardware information as well as respective machine learning model information to enable them to model a respective machine learning model and a respective target edge device environment for the compiler optimization process on said nodes.

21. The method of claim 14, wherein the hardware information comprises at least one of the following:
number of computing cores at each target edge device
type and number of machine learning accelerator threads at each target edge device; and
available memory at each target edge device.

22. The method of claim 14, wherein the method further comprises
receiving instructions at the plurality of computing nodes to execute a set of new scheduling and sequencing solutions for a new round of optimization in a further round of optimization following an analysis of the performance metrics corresponding to the scheduling and sequencing solution from said initial round of optimization;
applying at each computing node at least one of the sequencing and scheduling solution for the new set of scheduling and sequencing solutions thereby generating a respective new performance metric for the machine learning model;
sending said new performance metric to the controller for identifying said optimal sequencing and scheduling solution having the best performance metric amongst the applied sequencing and scheduling solutions,
repeating said steps of receiving instructions for new rounds of optimization, executing new sequencing and scheduling solutions and sending new performance metrics until a stop criterion is met.

23. The method of claim 17, wherein the compiler optimization process is initially executed for said machine learning model to derive a machine learning model specific optimal sequencing and scheduling solution, wherein said method further comprising:
receiving at the computing nodes instructions to execute sequencing and scheduling solutions for other machine learning models of said one or more machine learning models and for various heterogeneous compute environments;
reporting performance metrics for these solutions to the controller for deriving a set of optimal sequencing and scheduling solutions and for constructing a general compiler from said set of optimal sequencing and scheduling solutions that is statistically good for said one or more machine learning models and for different heterogeneous compute environments.

24. A controller for optimizing compilation of one or more machine learning models, wherein a machine learning model of said one or more machine learning models is to be executed on one or more target edge devices, said controller in communication with a plurality of compute nodes and comprising:
a processor configured to
allocate compute nodes of said plurality of compute nodes to a compiler optimization process for a compiler of said machine learning model, said machine learning model being generated in a machine learning framework and having a compute graph representation forming machine learning model information, wherein nodes of said compute graph representation are kernel operators necessary to execute the machine learning model and edges of said compute graph representation connect said kernel operators to define precedence constraints amongst the kernel operators;
schedule a round of optimization for the compiler optimization process amongst the allocated compute nodes, said compiler optimization process comprises applying at each allocated compute node at least one sequencing and scheduling solution that was determined based on hardware information for the one or more target edge devices and the precedence constraints, wherein each sequencing and scheduling solution maps the kernel operators upon hardware resources and upon compiling leads to execution on one of the compute nodes and results in a performance metric for the machine learning model;
receive from the compute nodes said performance metric for said round of optimization;
identify an optimal sequencing and scheduling solution having a best performance metric amongst the sequencing and scheduling solutions applied at the compute nodes; and
implement in the compiler the optimal sequencing and scheduling solution for generating machine code to execute the machine learning model on the one or more target edge devices.

25. The controller of claim 24, wherein the controller is one of the one or more target edge devices.

26. The controller of claim 24, wherein the controller is configured to communicate with the compute nodes in a wireless communication system, wherein each of said one or more target edge devices is a user equipment in said wireless communication system and wherein said controller is located in a server on a network side of the wireless communication system.

27. The controller of claim 24, wherein the hardware information comprises at least one of the following:
number of computing cores at each target edge device;
type and number of machine learning accelerator threads at each target edge device; and
available memory at each target edge device.

28. The controller of claim 24, wherein the processor is further configured to
check, if a stop criterion for the compiler optimization process has been met, and, if not,
analyse the performance metrics corresponding to the scheduling and sequencing solution from said round of optimization and identifying a set of new scheduling and sequencing solutions for a new round of optimization;

schedule a further round of optimization with said allocated compute nodes, wherein said compute nodes are assigned a respective one of the new scheduling and sequencing solutions for the further round of optimization;

receive from the allocated compute nodes new performance metrics for said further round of optimization;

repeat said steps of analysing, scheduling and identifying until the stop criterion is met; and identify said optimal sequencing and scheduling solution having the best performance metric amongst the sequencing and scheduling solutions applied at the compute nodes in the last round of optimization or over all rounds of optimization.

29. A system of plurality of compute nodes for optimizing compilation of one or more machine learning models, wherein a machine learning model of said one or more machine learning models is to be executed on one or more target edge devices, said plurality of compute nodes in communication with a controller and each node comprising:

a processor configured to receive instructions to participate in a compiler optimization process for a compiler of said machine learning model, said machine learning model being generated in a machine learning framework and having a compute graph representation forming machine learning model information, wherein nodes of said compute graph representation are kernel operators necessary to execute the machine learning model and edges of said compute graph representation connect said kernel operators to define precedence constraints amongst the kernel operators;

receive instructions to execute a round of optimization for the compiler optimization process including at least one respective sequencing and scheduling solution that was determined based on hardware information for the one or more target edge devices and the precedence constraints, applying said at least one respective sequencing and scheduling solution, wherein each applied sequencing and scheduling solution maps the kernel operators to hardware resources and corresponds to a respective machine code which upon execution on the compute nodes results in a respective performance metric for the machine learning model;

send said respective performance metric to the controller for identifying an optimal sequencing and scheduling solution having a best performance metric amongst the applied sequencing and scheduling solutions, and for implementing in the compiler the optimal sequencing and scheduling solution for executing the machine learning model on the one or more target edge devices.

30. The system of claim 29, wherein the compute nodes are configured to communicate with the controller in a wireless communication system, wherein each of said one or more target edge devices is a user equipment in said wireless communication system and wherein said controller is located in a server on a network side of the wireless communication system.

\* \* \* \* \*